US011869121B2

(12) United States Patent
Wang et al.

(10) Patent No.: US 11,869,121 B2
(45) Date of Patent: Jan. 9, 2024

(54) SYSTEMS AND METHODS FOR IMAGE RECONSTRUCTION

(71) Applicant: SHANGHAI UNITED IMAGING HEALTHCARE CO., LTD., Shanghai (CN)

(72) Inventors: Jingbo Wang, Shanghai (CN); Yuchen Wang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 124 days.

(21) Appl. No.: 17/305,333

(22) Filed: Jul. 5, 2021

(65) Prior Publication Data

US 2021/0343054 A1 Nov. 4, 2021

Related U.S. Application Data

(63) Continuation-in-part of application No. 16/037,813, filed on Jul. 17, 2018, now Pat. No. 11,055,882.

(30) Foreign Application Priority Data

Jun. 29, 2018 (CN) .......................... 201810721159.0

(51) Int. Cl.
*G06T 11/00* (2006.01)
(52) U.S. Cl.
CPC .......... *G06T 11/008* (2013.01); *G06T 11/005* (2013.01); *G06T 2211/412* (2013.01); *G06T 2211/421* (2013.01)

(58) Field of Classification Search
CPC ................ G06T 11/008; G06T 7/0012; G06T 2207/10081; G06T 2207/10088;
(Continued)

(56) References Cited

U.S. PATENT DOCUMENTS

2010/0121183 A1 5/2010 Taguchi et al.
2010/0239182 A1 9/2010 Basu
(Continued)

FOREIGN PATENT DOCUMENTS

CN 101986263 B 8/2012
CN 102567944 B 10/2013
(Continued)

OTHER PUBLICATIONS

First Office Action in Chinese Application No. 201810721159.0 dated Feb. 21, 2022, 17 pages.

*Primary Examiner* — Zhitong Chen
(74) *Attorney, Agent, or Firm* — METIS IP LLC

(57) ABSTRACT

A system includes a storage device storing a set instructions and a processor in communication with the storage device, wherein when executing the set of instructions, the processor is configured to cause the system to obtain raw data. The processor may also be configured to cause the system to determine one or more reconstruction-related algorithms and determine one or more containers for the one or more reconstruction-related algorithms. Each of the one or more containers may correspond to at least one of the one or more reconstruction-related algorithms. The system may also be configured determine a reconstruction flow based on the one or more containers and process the raw data according to the reconstruction flow to generate a target image.

20 Claims, 14 Drawing Sheets

(58) Field of Classification Search
CPC . G06T 2207/10104; G06T 2207/10108; G06T 2207/10116; G06T 2211/421
See application file for complete search history.

(56) References Cited

U.S. PATENT DOCUMENTS

| | | |
|---|---|---|
| 2012/0089015 A1* | 4/2012 | Gagnon ................ A61B 6/037 600/425 |
| 2014/0327923 A1* | 11/2014 | Nishikawa ............ G06F 3/1298 358/1.13 |
| 2016/0003926 A1 | 1/2016 | Boettcher |
| 2016/0163073 A1 | 6/2016 | Grass et al. |
| 2017/0178366 A1* | 6/2017 | Wang .................... G06T 11/006 |
| 2017/0337713 A1* | 11/2017 | Hoelzer ................ G06T 11/003 |
| 2019/0139273 A1 | 5/2019 | Lv et al. |
| 2020/0082580 A1 | 3/2020 | Magalotti et al. |
| 2020/0175682 A1 | 6/2020 | Yu et al. |

FOREIGN PATENT DOCUMENTS

| | | |
|---|---|---|
| CN | 102609978 B | 1/2014 |
| CN | 106296764 A | 1/2017 |

* cited by examiner

SYSTEMS AND METHODS FOR IMAGE RECONSTRUCTION

This present application is a continuation-in-part of U.S. application Ser. No. 16/037,813, filed on Jul. 17, 2018, which claims priority of Chinese Application No. 201810721159.0, filed on Jun. 29, 2018, the contents of each of which are hereby incorporated by reference.

TECHNICAL FIELD

The application generally relates to systems and methods for data processing, and more specifically relates to systems and methods for image reconstruction.

BACKGROUND

Currently, image reconstruction includes online reconstruction and offline reconstruction, and both may need a reconstruction protocol to determine a reconstruction flow. Once the reconstruction protocol is determined, a reconstruction system may process the raw data and generate a target image according to a reconstruction flow determined by the reconstruction protocol. In such occasions, the reconstruction process may be static and/or fixed. During the process, if the user is not satisfied with the images reconstructed or wants to change the reconstruction flow, the user may need to re-determine a new reconstruction protocol. It may be desirable to provide systems and methods for determining a reconstruction flow dynamically and/or discretely.

SUMMARY

According to an aspect of the present disclosure, a system is provided. The system may include a storage device and at least one processor in communication with the storage device. The storage device may store a set of instructions. When executing the set of instructions, the at least one processor may be configured to cause the system to perform one or more of the following operations. The at least one processor may be configured to cause the system to obtain raw data. The at least one processor may be configured to cause the system to determine one or more reconstruction-related algorithms and determine one or more containers for the one or more reconstruction-related algorithms. Each of the one or more containers may correspond to at least one of the one or more reconstruction-related algorithms. Then the at least one processor may be configured to cause the system to determine a reconstruction flow based on the one or more containers, and process the raw data according to the reconstruction flow to generate a target image.

According to another aspect of the present disclosure, a method is provided. The method may be implemented on a computing device having at least one processor and a storage device. The method may include obtaining, by the at least one processor, raw data. The method may also include determining, by the at least one processor, one or more reconstruction-related algorithms and determining, by the at least one processor, one or more containers for the one or more reconstruction-related algorithms. Each of the one or more containers may correspond to at least one of the one or more reconstruction-related algorithms. The method may further include determining, by the at least one processor, a reconstruction flow based on the one or more containers, and processing, by the at least one processor, the raw data according to the reconstruction flow to generate a target image.

According to yet another aspect of the present disclosure, a non-transitory computer-readable storage medium is provided. The non-transitory computer-readable storage medium may include a set of instructions. When the set of instructions is executed by a computing device, the set of instructions may cause the computing device to perform one or more of the following operations. The operations may include obtaining, by at least one processor, raw data. The operations may also include determining, by the at least one processor, one or more reconstruction-related algorithms and determining, by the at least one processor, one or more containers for the one or more reconstruction-related algorithms. Each of the one or more containers may correspond to at least one of the one or more reconstruction-related algorithms. The operations may further include determining, by the at least one processor, a reconstruction flow based on the one or more containers, and processing, by the at least one processor, the raw data according to the reconstruction flow to generate a target image.

In some embodiments, the at least one processor may be configured to cause the system further to obtain a first reconstruction-related algorithm from the one or more reconstruction-related algorithms and generate a container for the first reconstruction-related algorithm.

In some embodiments, the at least one processor may be configured to cause the system further to obtain a first reconstruction-related algorithm from the one or more reconstruction-related algorithms. The at least one processor may be configured to cause the system further to select an existing container, the existing container containing a second reconstruction-related algorithm. The at least one processor may be configured to cause the system further to replace the second reconstruction-related algorithm in the existing container with the first reconstruction-related algorithm.

In some embodiments, the at least one processor may be configured to cause the system further to obtain a first reconstruction-related algorithm from the one or more reconstruction-related algorithms. The at least one processor may be configured to cause the system further to select an existing container containing the first reconstruction-related algorithm.

In some embodiments, each of the one or more reconstruction-related algorithms may correspond to at most one container of the one or more containers.

In some embodiments, the at least one processor may be configured to cause the system further to obtain the one or more containers. The at least one processor may be configured to cause the system further to arrange the one or more containers in an order based on the containing reconstruction-related algorithms, and determine the reconstruction flow based on the one or more containers according to the order.

In some embodiments, the at least one processor may be configured to cause the system further to determine a first container group from the one or more containers, the first container group may include at least one container. The at least one processor may be configured to cause the system further to process the raw data using the first container group to generate image data. The at least one processor may be configured to cause the system further to determine a second container group from the one or more containers, the second container group including at least one container, and process the image data using the second container group to generate the target image.

In some embodiments, the at least one processor may be configured to cause the system further to obtain the image data. The at least one processor may be configured to cause the system further to obtain the second container group including at least one container. The at least one processor may be configured to cause the system further to determine a third container group from the second container group, the third container group including at least one container. The at least one processor may be configured to cause the system further to process the image data using the third container group to generate a preliminary image. The at least one processor may be configured to cause the system further to determine a fourth container group from the second container group, the fourth container group including at least one container, and process the preliminary image using the fourth container group to generate the target image.

In some embodiments, the at least one processor may be configured to cause the system further to release the one or more containers from the reconstruction.

According to yet another aspect of the present disclosure, a system is provided. The system may include a storage device and at least one processor in communication with the storage device. The system may also include an acquisition module configured to obtain raw data. The system may also include an algorithm determination module configured to determine one or more reconstruction-related algorithms. The systems may also include a container determination module configured to determine one or more containers for the one or more reconstruction-related algorithms. In some embodiments, each of the one or more containers may correspond to at least one of the one or more reconstruction-related algorithms. The system may also include a reconstruction flow determination module configured to determine a reconstruction flow based on the one or more containers. The system may further include a processing module configured to process the raw data according to the reconstruction flow to generate a target image.

In some embodiments, the container determination module may further include an algorithm acquisition unit configured to obtain a first reconstruction-related algorithm from the one or more reconstruction-related algorithms. In some embodiments, the container determination module may further include a container generation unit configured to generate a container for the first reconstruction-related algorithm.

In some embodiments, the container determination module may further include an algorithm acquisition unit configured to obtain a first reconstruction-related algorithm from the one or more reconstruction-related algorithms. In some embodiments, the container determination module may further include a container search unit configured to select an existing container. The existing container may contain a second reconstruction-related algorithm. In some embodiments, the container determination module may further include a container switch unit configured to replace the second reconstruction-related algorithm in the existing container with the first reconstruction-related algorithm.

In some embodiments, the container determination module may further include an algorithm acquisition unit configured to obtain a first reconstruction-related algorithm from the one or more reconstruction-related algorithms. In some embodiments, the container determination module may further include a container search unit configured to select an existing container. The existing container may contain the first reconstruction-related algorithm.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
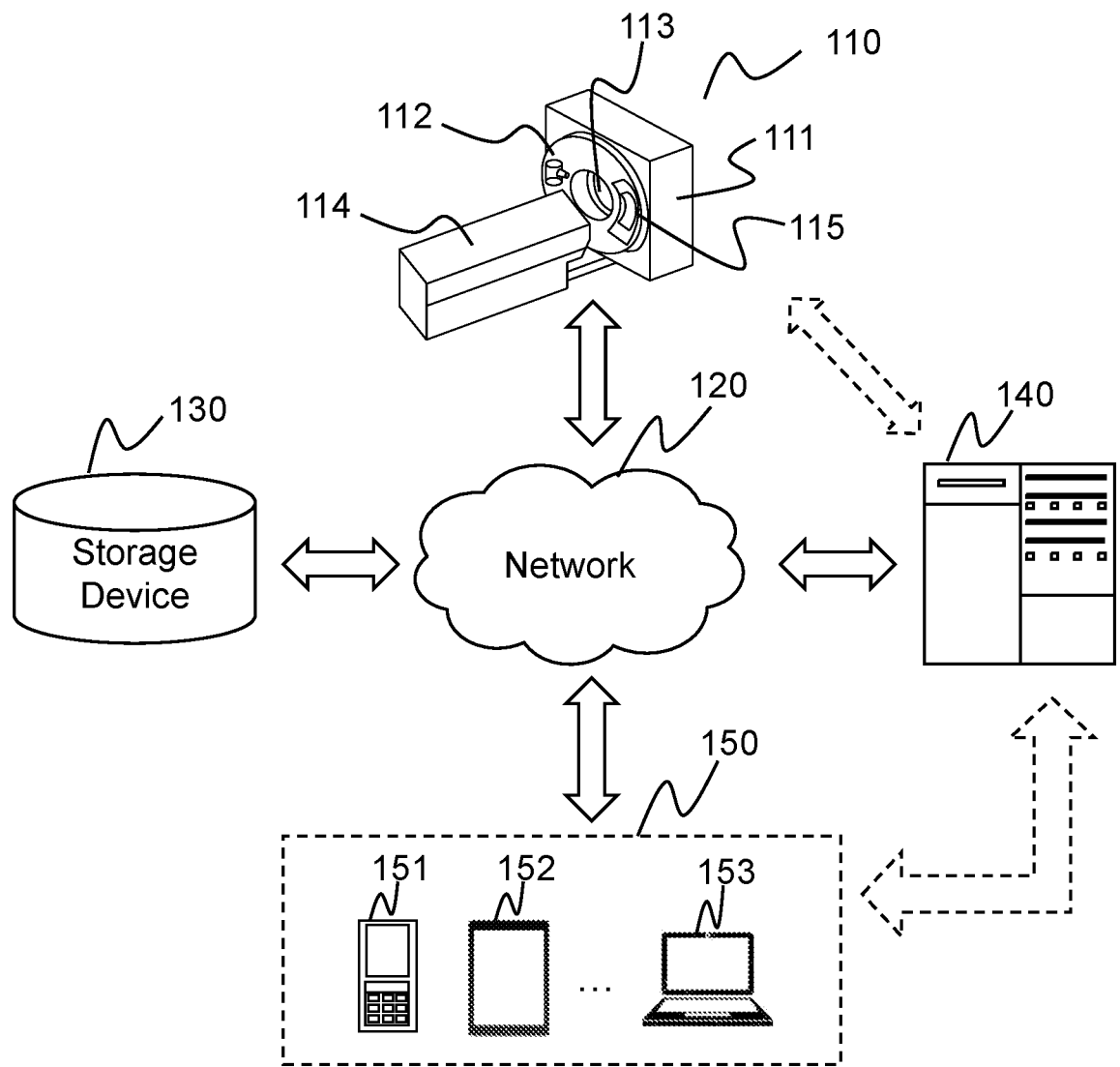
FIG. 1 is schematic diagrams illustrating an exemplary imaging system according to some embodiments of the present disclosure.

In the following detailed description, numerous specific details are set forth by way of examples to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for illustration and description only and are not intended to limit the scope of the present disclosure. It is understood that the drawings are not to scale.

The present disclosure describes systems and methods for processing raw data to generate a target image using one or more containers. For example, the systems may perform the methods to determine one or more reconstruction-related algorithms. The systems may also determine one or more containers, and each container may contain a reconstruction-related algorithm of the one or more reconstruction-related algorithms. The systems may further determine a reconstruction flow based on the one or more containers. Then a target image may be reconstructed using the reconstruction flow. In some embodiments, the one or more containers and the reconstruction flow may be determined dynamically and/or discretely during the reconstruction process.

Merely by way of example, the systems may initiate or generate multiple containers in response to a reconstruction task. The reconstruction task may include raw data and descriptions of multiple reconstruction-related algorithms to be used for processing the raw data. Each of the containers may correspond to one of the reconstruction-related algorithms or a segment of the reconstruction-related algorithm. The containers may be implemented on a same reconstruction device or different reconstruction devices. For each of the containers, a specific hardware resource may be dynamically assigned to operate the reconstruction-related algorithm of the container. Also, the container may compile its contained reconstruction-related algorithm from a default format to a specific format such that the compiled reconstruction-related algorithm can be implemented on the assigned hardware resource. Therefore, the systems may achieve dynamical management of resources for data processing. Further, the containers may be assigned to generate a reconstruction flow for generating a target image based on the raw data. In such occasions, different hardware resources may be selected dynamically for operating the reconstruction-related algorithms respectively and the reconstruction flow may be generated discretely. Accordingly, the reconstruction flow may be dynamically assembled and revised by using the containers. In some embodiments, the systems may manage one or more reconstruction flows that are operated simultaneously according to the resource usage and/or availability (e.g., a count of containers, a count of concurrent or sequential reconstruction flows to be performed, operation capacities of the hardware resource(s), etc.).

FIG. 1 is schematic diagrams illustrating an exemplary imaging system according to some embodiments of the present disclosure. The imaging system 100 may include a Computed Tomography (CT) system, an Emission Computed Tomography (ECT) system (e.g., a Positron Emission Tomography (PET) system, a Single Photon Emission Computed Tomography (SPECT) system), and a multi-modality system, a Magnetic Resonance Imaging (MRI) system, etc. The imaging system 100 may include a multi-modality system including, for example, a Computed Tomography-Positron Emission Tomography (CT-PET) system, a Magnetic Resonance-Positron Emission Tomography (MR-PET) system, etc. In some embodiments, the imaging system 100 may include modules and/or components for performing CT imaging and/or related analysis. Merely by way of example, the imaging system 100 may include a CT scanner 110, a network 120, a storage device 130, a processing device 140, and one or more terminals 150.

In some embodiments, the CT scanner 110, the processing device 140, the terminals 150, and the storage device 130 may be connected to and/or communicate with each other via a wireless connection (e.g., the network 120), a wired connection, or a combination thereof. The connection between the components of the imaging system 100 may be variable. Merely by way of example, the CT scanner 110 may be connected to the processing device 140 through the network 120, as illustrated in FIG. 1. As another example, the CT scanner 110 may be connected to the processing device 140 directly. As a further example, the storage device 130 may be connected to the processing device 140 through the network 120, as illustrated in FIG. 1, or connected to the processing device 140 directly.

The CT scanner 110 may be configured to scan an object (not shown in FIG. 1) under examination and generate raw data of the object. The object may include a substance, tissue, an organ, a specimen, a body, or the like, or any combination thereof. In some embodiments, the object may include a patient or a part thereof. The object may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. The CT scanner 110 may include a gantry 111, an X-ray generator 112 and a detector 115 mounted on the gantry 111, a detection region 113, and a subject table 114.

The X-ray generator 112 may include one or more X-ray tubes. An X-ray tube may emit X-rays (or referred to as X-ray beams) by an X-ray tube. The X-ray generator 112 may be a cold cathode ion tube, a high vacuum hot cathode tube, a rotating anode tube, etc. The shape of the emitted X-ray beams may be a line, a narrow pencil, a narrow fan, a fan, a cone, a wedge, or the like, or an irregular shape, or any combination thereof. An X-ray tube in the X-ray generator 112 may be fixed at a location. An X-ray tube may be translated or rotated in some scenarios.

The detector 115 may be configured to receive the X-rays emitted from the X-ray generator 112 or another radiation source. The X-rays from the X-ray generator 112 may traverse the object under examination, and then reach the detector 115. After receiving the X-rays, the detector 115 may generate the raw data of an X-ray image of the object under examination. The term "raw data" may refer to data that may be detected by the detector 115, and the raw data may be utilized to reconstruct an X-ray image. The detector 115 may be configured to receive X-rays and generate the raw data of an X-ray image of the object under examination. The detector 115 may include an X-ray detector or other components. The shape of the X-ray detector may be flat, arc-shaped, circular, or the like, or any combination thereof. The fan angle of the arc-shaped detector may be an angle ranging from 0° to 360°. The fan angle may be fixed or adjustable according to different conditions including, for example, the desired resolution of an image, the size of an image, the sensitivity of a detector, the stability of a detector, or the like, or any combination thereof. In some embodiments, the pixels of the detector 115 may be the number of the smallest detecting units, e.g., the number of detector cells (e.g., a scintillator or a photosensor). The pixels of the detector 115 may be arranged in a single row, two rows, or another number of rows. The X-ray detector may be one-dimensional, two-dimensional, or three-dimensional.

In some embodiments, the detected raw data may be stored or archived in a storage (e.g., the storage device 130 or a storage module of the processing device 140), processed by the processing device 140, or transferred to an external processing and/or storage device (e.g., a cloud server) via a cable, or a wired or wireless network (e.g., the network 120).

The network 120 may include any suitable network that can facilitate the exchange of information and/or data within the imaging system 100 or between a component of the imaging system 100 and an external device. In some embodiments, one or more components of the imaging system 100 (e.g., the CT scanner 110, the storage device 130, the processing device 140, the terminals 150) may exchange information and/or data with one or more other components of the imaging system 100 via the network 120. For example, the processing device 140 may receive raw data from the CT scanner 110 or the storage device 130 directly or via the network 120.

The network 120 may be a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network (VPN), a satellite network, a telephone network, routers, hubs, switches, server computers, or the like, or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The storage device 130 may store data, instructions, and/or any other information. In some embodiments, the storage device 130 may store the raw data obtained by the CT scanner 110. In some embodiments, the storage device 130 may store data obtained from the processing device 140. In some embodiments, the storage device 130 may store data and/or instructions that the processing device 140 may execute or use to perform exemplary processes or methods described in the present disclosure.

In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 120 to communicate with one or more other components of the imaging system 100 (e.g., the CT scanner 110, the processing device 140, the terminals 150). One or more components of the imaging system 100 may access the data or instructions stored in the storage device 130 via the network 120. In some embodiments, the storage device 130 may be directly connected to or communicate with one or more other components of the imaging system 100 (e.g., the CT scanner 110, the processing device 140, the terminals 150). In some embodiments, the storage device 130 may be part of the processing device 140.

The processing device 140 may process data (e.g., raw data, image data, a plurality of image slices) obtained from the CT scanner 110, and/or the storage device 130. In some embodiments, the processing device 140 may be a single server or a server group. The server group may be centralized or distributed. In some embodiments, the processing device 140 may be local to or remote from other components of the imaging system 100. The processing device 140 may access raw data produced by the CT scanner 110, stored by the storage device 130, an external storage device via, for example, the network 120. Alternatively, the processing device 140 may be directly connected to the CT scanner 110, and/or the storage device 130 to access the raw data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components illustrated in FIG. 2.

The terminal(s) 150 may include a mobile device 151, a tablet computer 152, a laptop computer 153, etc. In some embodiments, the mobile device 151 may include a smart home device, a wearable device, a mobile device, a virtual reality device, an augmented reality device, or the like, or any combination thereof. Exemplary smart home device may include a smart lighting device, a control device of an intelligent electrical apparatus, a smart monitoring device, a smart television, a smart video camera, an interphone, or the like, or any combination thereof. Exemplary wearable device may include a bracelet, footgear, eyeglasses, a helmet, a watch, clothing, a backpack, a smart accessory, or the like, or any combination thereof. Exemplary mobile device may include a mobile phone, a personal digital assistant (PDA), a gaming device, a navigation device, a point of sale (POS) device, a laptop, a tablet computer, a desktop, or the like, or any combination thereof. Exemplary virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 150 may be implemented on the processing device 140.

It should be noted that the above description of the imaging system 100 is merely provided for illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios. Merely by way of example, some other components may be added into the imaging system 100, such as a patient positioning unit, a gradient amplifier unit, and other devices or units. However, those variations and modifications do not depart from the scope of the present disclosure.

Figure 2:
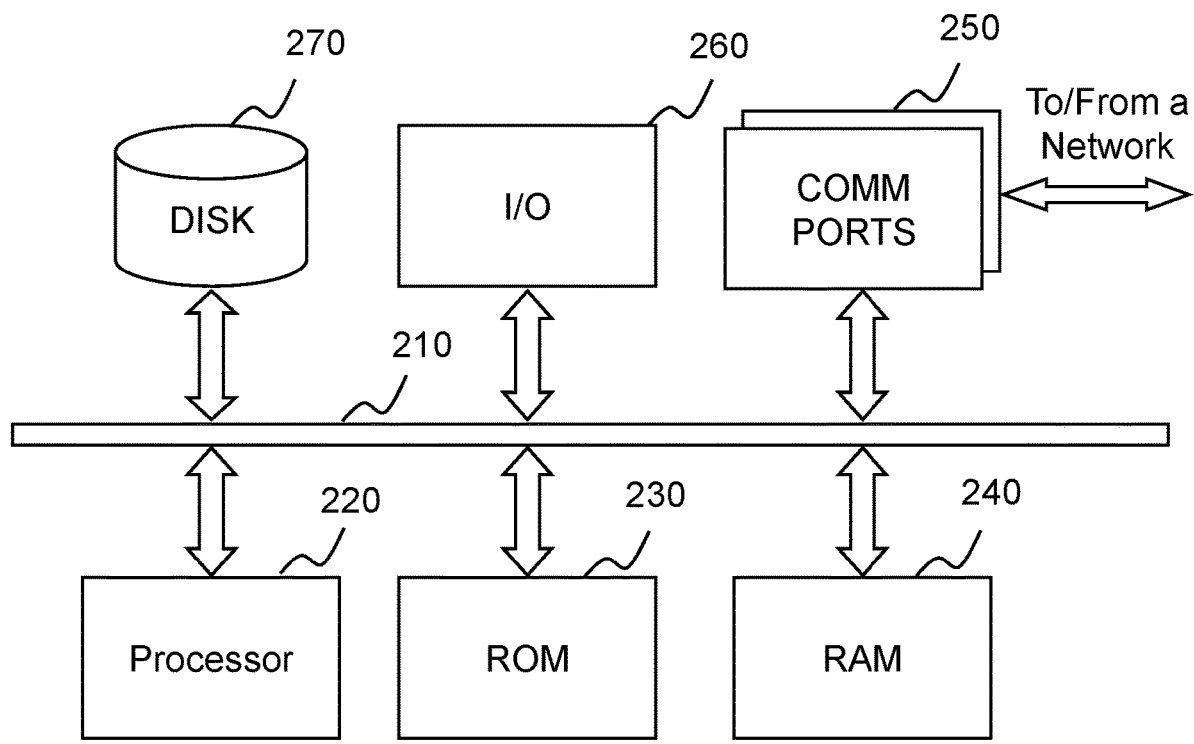
FIG. 2 is a schematic diagram illustrating hardware and/or software components of an exemplary computing device according to some embodiments of the present disclosure.

FIG. 2 is a schematic diagram illustrating hardware and/or software components of an exemplary computing device on which the processing device 140 may be implemented according to some embodiments of the present disclosure. For example, the processing device 140 may be implemented on the computing device 200 and configured to perform functions of the processing device 140 disclosed in this disclosure.

The computing device 200 may be a general purpose computer or a special purpose computer. Both may be used to implement the processing device 140 of the present disclosure. For example, the processing device 140 of the imaging system 100 may be implemented on the computing device 200, via its hardware, software program, firmware, or a combination thereof. Although only one such computer is shown for convenience, the computer functions related to the imaging system 100 as described herein may be implemented in a distributed manner on a number of similar platforms to distribute the processing load.

The computing device 200, for example, may include communication (COMM) ports 250 connected to and from a network (e.g., the network 120) connected thereto to facilitate data communications. The computing device 200 may also include a processor (e.g., a central processing unit (CPU)) 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computer device 200 may include program storage and data storage of different forms, for example, a disk 270, and a read-only memory (ROM) 230, or a random access memory (RAM) 240, for various data files to be processed and/or transmitted by the computer. The computing device 200 may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration purposes, only one processor is described in the computing device 200. However, it should be noted that the computing device 200 in the present disclosure may also include multiple processors. Thus operations that are performed by one processor as described in the present disclosure may also be jointly or separately performed by the multiple processors. For example, the processor of the computing device 200 executes both operation A and operation B. As another example, operation A and operation B may also be performed by two different processors jointly or separately in the computing device 200 (e.g., the first processor executes operation A and the second processor executes operation B, or the first and second processors jointly execute operations A and B).

Figure 3:
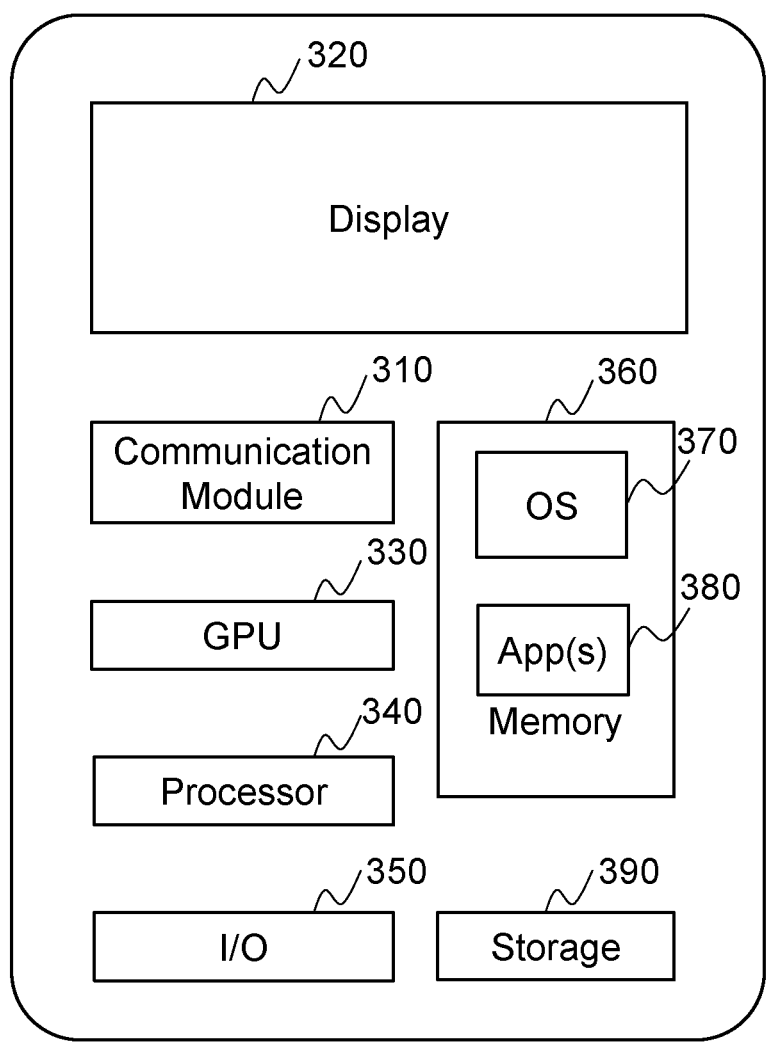
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device on which the terminals 150 may be implemented according to some embodiments of the present disclosure. As illustrated in FIG. 3, the mobile device 300 may include a communication module 310, a display 320, a graphic processing unit (GPU) 330, a processor (e.g., a central processing unit (CPU), or a peripheral component interconnect express (PCIE) device) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 to be executed by the processor 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
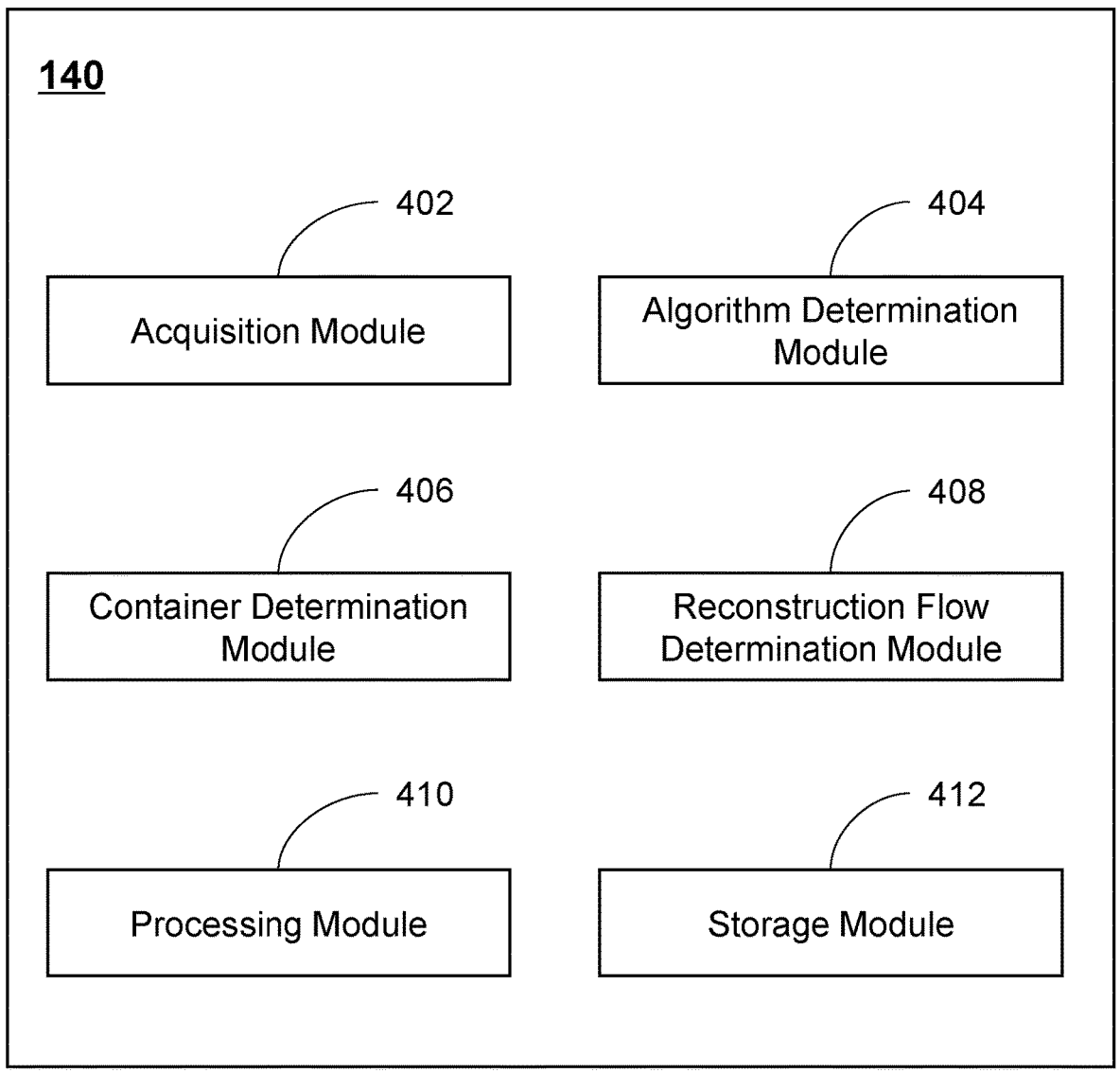
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 140 may include an acquisition module 402, an algorithm determination module 404, a container determination module 406, a reconstruction flow determination module 408, a processing module 410, and a storage module 412.

The acquisition module 402 may be configured to obtain raw data. For example, the acquisition module 402 may obtain raw data of an X-ray image of the object under examination generated by the detector 115. In some embodiments, the acquisition module 402 may obtain the raw data from the CT scanner 110 or the storage device 130.

The algorithm determination module 404 may be configured to determine one or more reconstruction-related algorithms. The reconstruction-related algorithm may include an algorithm related to image reconstruction, or a part of an algorithm related to image reconstruction. In some embodiments, the reconstruction-related algorithm may include Air Correction, Bad Channel, Beam Run, HU Correction, Row Combine, Filter Back Projection (FBP), Image Filter, Ring Off, Windmill, Bone Correction, iterative metal artifact reduction (IMAR), or the like, or any combination thereof, or a part thereof. For example, some algorithms related to image reconstruction may be divided into a plurality of sub-algorithms. The sub-algorithms may be standardized according to certain rules, such as having the same format of input and/or output. The reconstruction-related algorithm may include one or more of the plurality of sub-algorithms. In some embodiments, the reconstruction-related algorithms may include one or more pre-processing algorithms (e.g., algorithms relating to data retrieval, data conversion, etc., of raw data), one or more image creating algorithms (e.g., algorithms relating to image generation based on the pre-processed data), one or more post-processing algorithms (e.g., algorithms relating to artifact removal, etc., of the created image), etc.

In some embodiments, the algorithm determination module 404 may determine one or more reconstruction-related algorithms based on the raw data and/or a scan protocol. For example, the one or more reconstruction-related algorithms may be determined based on the object under examination or based on a scan mode, such as axial, helical, spiral. Merely by way of example, the algorithm determining module 404 may determine the Bone Correction in the case that the object under the examination is the head. As another example, the algorithm determining module 404 may determine the FBP algorithm in the case that the scan mode is spiral. In some embodiments, the algorithm determination module 404 may determine one or more reconstruction-related algorithms according to instructions entered by a user (e.g., a doctor) through the terminal 150 or the processing device 140.

The container determination module 406 may be configured to determine one or more containers for the one or more reconstruction-related algorithms determined by the algorithm determination module 404. The container may be associated with at least one process (e.g., a group of processes or a group of threads) and implemented on the computing device 200. The container may occupy a resource of the computing device 200 (also called the designated resource), such as the resource of processors and/or memory (e.g., a CPU). A container may contain one or more reconstruction-related algorithms and may execute only one reconstruction-related algorithm at a time. In some embodiments, a container may contain only one reconstruction-related algorithm (or a standardized sub-algorithm thereof). As used herein, a container corresponding to a reconstruction-related algorithm refers to the container that contains the reconstruction-related algorithm. The container may be performed to process data according to the reconstruction-related algorithm included therein using the designated resource. For example, the container may be employed repeatedly to process different data (e.g., different portions of a same imaging data set obtained by scanning an object, different portions of different imaging data sets obtained by scanning different objects) according to the reconstruction-related algorithm implemented by the container once the container is generated. In some embodiments, the container may provide a specific circumstance for a reconstruction-related algorithm and may execute a predetermined format of instructions, such as OpenCL, C, C++, Python, etc. For brevity, the container may be a unit that can execute an algorithm (e.g., a reconstruction algorithm or a portion thereof). Merely by way of example, the container may contain a reconstruction-related algorithm which is written in a computer language of OpenCL. The container may be used to process data input according to the contained reconstruction-related algorithm using the designated resource of the computing device 200. In some embodiments, the container may contain a default reconstruction-related algorithm when it is generated.

In some embodiments, each container may have a tag or a symbol, for example, PRE-1-1, PRE-1-2, IC-1-1, POST-1-1, etc. The tag of the each container may be associated with a name that describes the reconstruction-related algorithm included therein. For instance, each container may be marked with a symbol based on a position of the container in a reconstruction flow. The symbol may be configured to confirm an inclusion of the container in the reconstruction flow and prevent the container from being included in a second reconstruction flow that is coexistent with and different from the reconstruction flow.

The imaging system 100 may dynamically adjust the total number (or count) of the containers in the imaging system 100. For example, the imaging system 100 may linearly adjust the total number of the containers in the imaging system 100 based on reconstruction task, e.g., the number of reconstruction processes at the same time. That is, the greater the number (or count) of reconstruction flows operating concurrently is, the greater the total number (or count) of the containers in the imaging system 100 may be.

In some embodiments, for each reconstruction-related algorithm, the reconstruction-related algorithm may include different sections such as a description section storing a description of the reconstruction-related algorithm, a configuration section storing specifications of the reconstruction-related algorithm, etc. The description of the reconstruction-related algorithm may include information (e.g., a name or an identification) that can facilitate the identification of the reconstruction-related algorithm and differ the reconstruction-related algorithm with other reconstruction-related algorithms. The specifications of the reconstruction-related algorithm may include a content of the reconstructed-related algorithm, an amount of resource that the reconstruction-related algorithm needs to utilize corresponding to different hardware resources, a next reconstruction-related algorithm needs to be used after the reconstruction-related algorithm, or the like, or a combination thereof. The content of the reconstructed-related algorithm may include algorithm details (e.g., code) of the reconstructed-related algorithm. The container determination module 406 may determine or generate a container for implementing the reconstruction-related algorithm. The container determination module 406 may configure the container based on information available in the configuration section of the reconstruction-related algorithm. For instance, the container determination module 406 may label or mark the container with a tag or symbol associated with the description section of the reconstruction-related algorithm (e.g., the description of the reconstruction-related algorithm). As another example, the container determination module 406 may configure the container with a capacity of compiling the reconstruction-related algorithm to a format (e.g., computer language of OpenCL) understandable by a hardware resource according to the configuration section of the reconstruction-related algorithm (e.g., a content of the reconstruction algorithm). As another example, the container determination module 406 may configure the container with a capacity of dynamically determining, from a plurality of hardware resources, a hardware resource that is idle, e.g., according to the configuration section of the reconstruction-related algorithm (e.g., an amount of resource that the reconstruction-related algorithm needs to utilize). Descriptions of the capacities of the container may be found elsewhere in the present disclosure.

It should be noted that the container determination module 406 may determine a container for each of the one or more reconstruction-related algorithms determined by the algorithm determination module 404. In some embodiments, the container determination module 406 may determine a container for a reconstruction-related algorithm of the one or more reconstruction-related algorithms by selecting a container that has already been in existence in the processing device 140. Alternatively or additionally, the container determination module 406 may determine a container for a reconstruction-related algorithm of the one or more reconstruction-related algorithms by generating a new container by the processing device 140. Alternatively or additionally, the existing container or the newly generated container may contain any reconstruction-related algorithm, such as a default reconstruction-related algorithm, other than the reconstruction-related algorithm of the one or more reconstruction-related algorithms, and the container determination module 406 may replace the default reconstruction-related algorithm with the reconstruction-related algorithm of the one or more reconstruction-related algorithms. Merely by way of example, a reconstruction task may include raw data to be processed and descriptions (e.g., a name or an identification) of reconstruction-related algorithm(s) needed to be used. In response to the reconstruction task, the algorithm determination module 404 may determine the reconstruction-related algorithm(s). For each of the reconstruction-related algorithms, the container determination module 406 may determine whether there is an existing container containing the reconstruction-related algorithm. As used herein, an existing container (also referred to as an idle container or an available container) refers to a container that exists and is not included in any other reconstruction flow. In response to determining that there is no existing container containing the reconstruction-related algorithm, the algorithm determination module 404 may generate a new container for the reconstruction-related algorithm. The new container may be labeled with tag or symbol associated with a description of the reconstruction-related algorithm. The new container may be configured with a capacity of compiling the reconstructed-related algorithm to a format understandable by the hardware resource. Additionally or alternatively, the new container may be configured with a capacity of dynamically determining, according to specifications of the reconstruction-related algorithm from a plurality of hardware resources, a hardware resource that is idle for implementing the reconstruction-related algorithm. In some embodiments, the container determination module 406 may determine the container for the reconstruction-related algorithm based on an existing container containing another algorithm. In response to determining that there is an existing container containing another algorithm, the container determination module 406 may recruit the existing container for the reconstruction-related algorithm. Details about the container determination module 406 may be described elsewhere in this disclosure (e.g., FIGS. 6 and 7, and the description thereof).

Figure 13A:
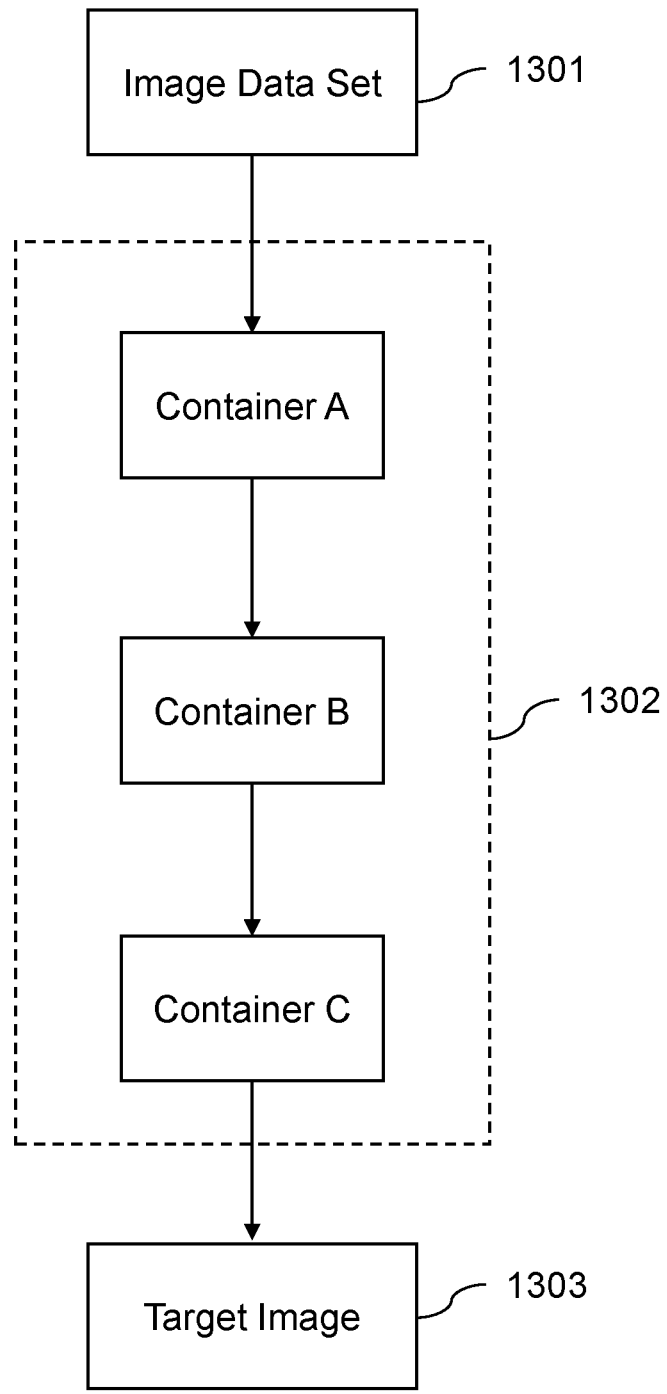
FIGS. 13A and 13B are schematic diagrams illustrating exemplary container arrangements of a reconstruction flow according to some embodiments of the present disclosure.
Figure 13B:
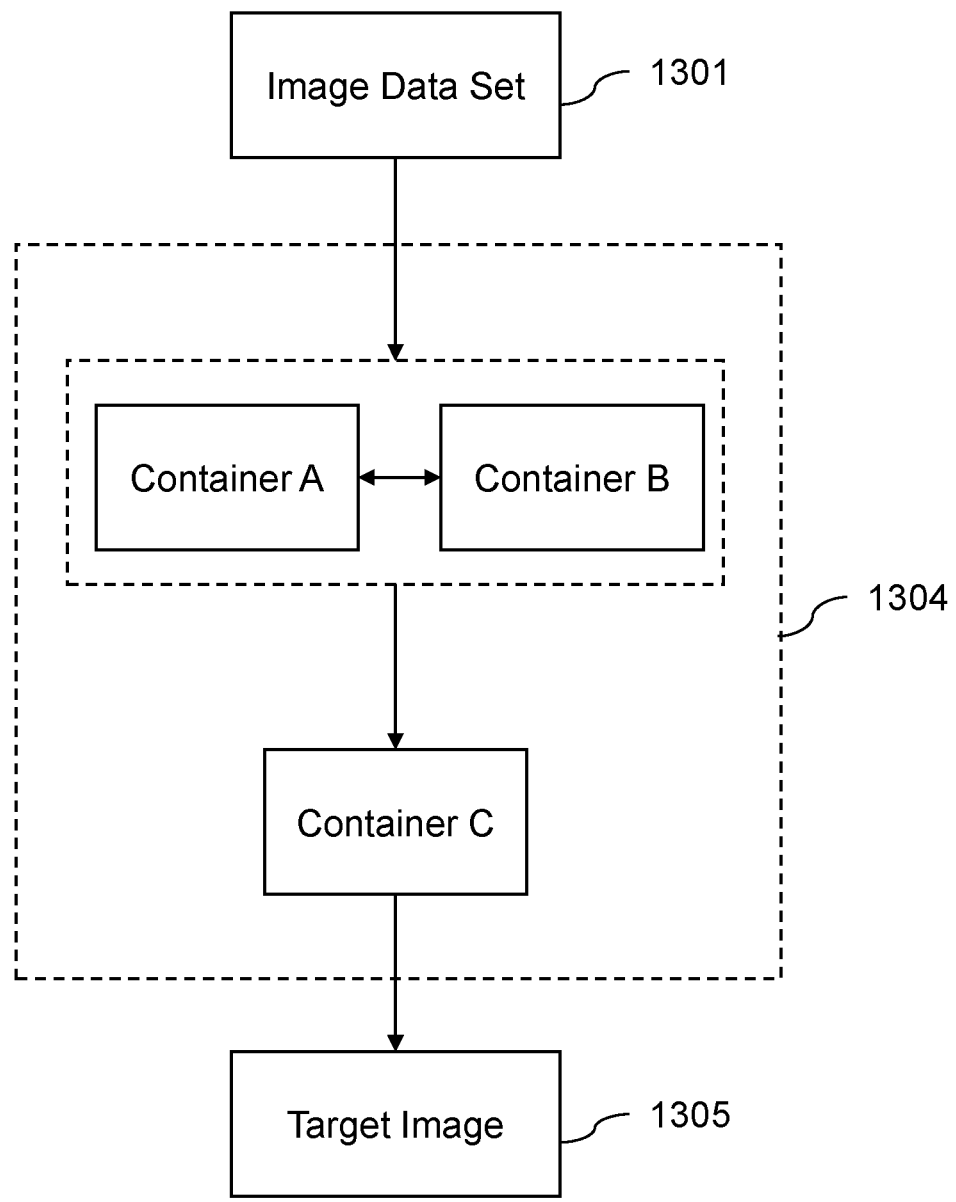

In some embodiments, multiple containers of a reconstruction flow may be arranged in series. For instance, as shown in FIG. 13A, a reconstruction flow 1302 for generating a target image 1303 includes containers A, B, and C; portions of an imaging data set 1301 may be processed by container A, container B, and container C in sequence, respectively. In some embodiments, at least a portion of multiple containers of a reconstruction flow may be arranged in parallel. For instance, as shown in FIG. 13B, a reconstruction flow 1304 for generating a target image 1305 includes containers A, B, and C in which container A and B are arranged in parallel, and container C is arranged in series with containers A and B; portions of the imaging data set 1303 need to be processed by container A, container B, and container C; the order in which a portion of the imaging data set to be processed in container A, container B, and container C is not in series as that in FIG. 13 A. The order in which a portion of the imaging data set is processed by container A or container B is inconsequential; that is, a portion of the imaging data set may be processed in container A, then in container B, and finally in container C, or the portion of the imaging data set may be processed in container B, then in container A, and finally in container C. Merely by way of example, some of the imaging data set may be first processed in container A and then container B to produce partially processed imaging data, and some of the imaging data set may be first processed in container B and then container A to produce partially processed imaging data, and the partially processed imaging data may be processed in container C. By arranging some containers of a reconstruction flow in parallel, the time for processing the imaging data set may be reduced, thereby improving the efficiency of the processing of the imaging data.

As described aforementioned, the container may be associated with a process (e.g., a group of processes or a group of threads) and implemented on the computing device 200. In some embodiments, the hardware resource associated with the container may be dynamically assigned and/or adjusted among different types of hardware resources in the computing device 200 and/or the mobile device 300. Such different types of hardware resources may include a CPU (e.g., the processor 220, the processor 340, etc.), a GPU (e.g., the GPU 330), a Field Programmable Gate Array (FPGA) device, or other hardware resources of the imaging system 100 that can execute data processing tasks (e.g., data processing tasks of a reconstruction flow). In other words, a container may be dynamically assigned with a hardware resource which, under some circumstance, may be adjusted during a reconstruction flow. For instance, a container of a reconstruction flow may be assigned with a hardware resource of a first type and then a hardware resource of a second type. Different types of hardware resources may take instructions in different computer languages. For example, when an algorithm is to be implemented on a CPU, the algorithm may need to be compiled to codes or a computer language of a first form understandable by the CPU. As another example, when the algorithm is to be implemented on a GPU, the algorithm may need to be compiled to codes or a computer language of a second form. understandable by the GPU. The first form may be different from the second form.

In some embodiments, the container may also be configured with a capacity of compiling an algorithm (e.g., a reconstruction-related algorithm) that is contained in the container. Additionally or alternatively, the container may be configured with a capacity of dynamically determining a specific hardware resource that is idle and may be used for data processing. For example, when a container is determined as described elsewhere in the present disclosure (e.g., based on a reconstruction task), the container may be initiated to identify a specific hardware resource that is idle and includes sufficient resource from, e.g., different types of hardware resources available. For example, for a container containing a specific reconstruction-related algorithm, the container may identify the specific hardware resource for implementing the specific reconstruction-related algorithm according to a configuration section of the specific reconstruction-related algorithm (e.g., an amount of resource that the reconstruction-related algorithm needs to utilize corresponding to different hardware resources). When the specific hardware resource is identified, the container may compile its contained reconstruction-related algorithm according to a specific form of computer language that can be implemented on the specific hardware resource. Then, the compiled reconstruction-related algorithm contained in the container may be implemented on the specific hardware resource for data processing. In such cases, the different types of hardware resources may be dynamically allocated for completing the reconstruction task, which may improve the reconstruction efficiency and/or the utilization efficiency of the different types of hardware resources.

In some embodiments, the container determination module 406 may determine a plurality of containers which are also referred to as a container pool. Merely by way of example, the reconstruction-related algorithms may include one or more pre-processing algorithms (e.g., relating to data reading, data conversion, etc. of raw data), one or more image creating algorithms (e.g., relating to image generation based on the pre-processed data), one or more post-processing algorithms (e.g., relating to artifact removal, etc. of the created image), etc. Accordingly, the plurality of containers may include different types of pre-processing container(s), image creating container(s), post-processing container(s), etc. For each of the reconstruction-related algorithms, the container determination module 406 may determine the count of containers used for implementing the reconstruction-related algorithm. Merely by way of example, the container determination module 406 may determine only one container to be used for implementing the reconstruction-related algorithm. As another example, the container determination module 406 may determine more than one container to be used for implementing the reconstruction-related algorithm. Each of more than one container may correspond to the reconstruction-related algorithm and perform data processing according to the reconstruction-related algorithm. For instance, if the reconstruction-related algorithm of a reconstruction flow is time-consuming, compared to one or more other reconstruction-related algorithms of the reconstruction flow, the container determination module 406 may determine more than one container to be used for implementing the reconstruction-related algorithm, thereby improving the bottleneck of the reconstruction flow and the overall efficiency of the reconstruction flow. As still another example, the container determination module 406 may determine more than one container each corresponding to a sub-algorithm of the reconstruction-related algorithm. Each of more than one container may perform data processing according to its corresponding sub-algorithm.

In some embodiments, each of the plurality of containers in the container pool may be configured with a capacity of data transmission between different containers of the container pool according to the reconstruction flow. For example, a first container containing a pre-processing algorithm may receive a data input (e.g., including raw data to be reconstructed). The first container may process the data input according to the pre-processing algorithm and generate a first intermediary output (e.g., pre-processed data). The first container may transmit the first intermediary output to a second container (e.g., a container containing another pre-processing algorithm or a container containing an image creating algorithm) as an input of the second container. The second container may receive the first intermediary output and process it according to its contained algorithm to obtain a second intermediary output.

As another example, the pre-processing process may be fixed once a scan mode under which the raw data is acquired by scanning an object is determined. Accordingly, the one or more pre-processing algorithms may be fixed and a group of first containers each containing a pre-processing algorithm may pre-determined (e.g., arranged as shown in FIG. 13A or 13B). During online reconstruction, the raw data may be, continuously or in batches, input to the group of first containers when the object is being scanned. The group of first containers may generate a first group of intermediary outputs. The group of first containers may transmit the first group of intermediary outputs to a third container containing an image creating algorithm, e.g., in a chronological order according to which the first group of intermediary outputs are generated. The third container may process the first group of intermediary outputs according to its contained algorithm successively or simultaneously to generate a further intermediary output. If the third container processes the first group of intermediary outputs simultaneously, the third container may be configured with a capacity of data caching. Further, the third container may transmit the further intermediary output(s) to one or more fourth containers each containing a post-processing algorithm. The number (or count) of the one or more fourth containers may depend on what post-processing algorithm are needed.

In some embodiments, some of the plurality of containers in the container pool may operate in parallel. That is, some of the plurality of containers may operate concurrently as described elsewhere in the present disclosure. In some embodiments, during image reconstruction, containers containing different reconstruction-related algorithms may operate in parallel. For instance, the different reconstruction-related algorithms may include different pre-processing algorithms, different image creating algorithms, different post-processing algorithms, etc. Multiple containers may operate at the same time; that is, a portion of raw data may be processed in one or more containers for pre-processing algorithms, and concurrently, a portion of the raw data may be processed in one or more containers for image creating algorithms. Alternatively, containers containing the same reconstruction-related algorithms may operate in parallel. For example, the raw data may be divided into multiple data sets or portions. Each of the multiple data sets or portions may be input to one of the containers containing the same reconstruction-related algorithms. Then, the containers may operate in parallel and process the multiple data sets or portions concurrently.

The reconstruction flow determination module 408 may be configured to determine a reconstruction flow based on one or more containers. As used herein, the reconstruction flow may represent a data process flow including, e.g., multiple containers that are executed in an order.

In some embodiments, the reconstruction flow determination module 408 may determine the reconstruction flow by arranging the one or more containers in an order based on the contained reconstruction-related algorithm. For example, at least some of the multiple containers in the reconstruction flow may be arranged in series. As another example, at least some of the multiple containers in the reconstruction flow may be arranged in parallel as described elsewhere in the present disclosure. Details about the reconstruction flow determination module 408 may be described elsewhere in the present disclosure, e.g., FIG. 8 and the description thereof.

The processing module 410 may be configured to process the raw data obtained by the acquisition module 402 according to the reconstruction flow determined by the reconstruction flow determination module 408. In some embodiments, the processing module 410 may generate a target image by processing the raw data according to the reconstruction flow. In some embodiments, the processing module 410 may separate the reconstruction flow into several container groups. Each container group may include at least one container of the reconstruction flow. Details about the processing module 410 may be described elsewhere in the present disclosure, e.g., FIG. 8 and the description thereof.

The storage module 412 may be configured to store obtained the raw data, the data, the images generated in the reconstruction process, the one or more reconstruction-related algorithms, or the like, or any combination thereof. In some embodiments, the storage module 412 may include a mass storage, removable storage, a volatile read-and-write memory, a read-only memory (ROM), or the like, or any combination thereof. The mass storage may include a magnetic disk, an optical disk, a solid-state drive, etc. The removable storage may include a flash drive, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage module 412 may store one or more programs and/or instructions that may be executed by the processor 220 of the processing device 140 (e.g., the processing module 410) to perform exemplary methods and/or processes described in the disclosure. For example, the storage module 412 may store programs and/or instructions executed by the processor 220 of the processing device 140 to obtain raw data, determine one or more reconstruction-related algorithm, determine one or more containers, determine a reconstruction flow, reconstruct an image based on the raw data, or display any intermediate result or a resultant image.

The modules of the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the acquisition module 402 and the algorithm determination module 404 may be combined into a single module that may be configured to obtain the raw data and determine the one or more reconstruction-related algorithms based on the obtained raw data.

Figure 5:
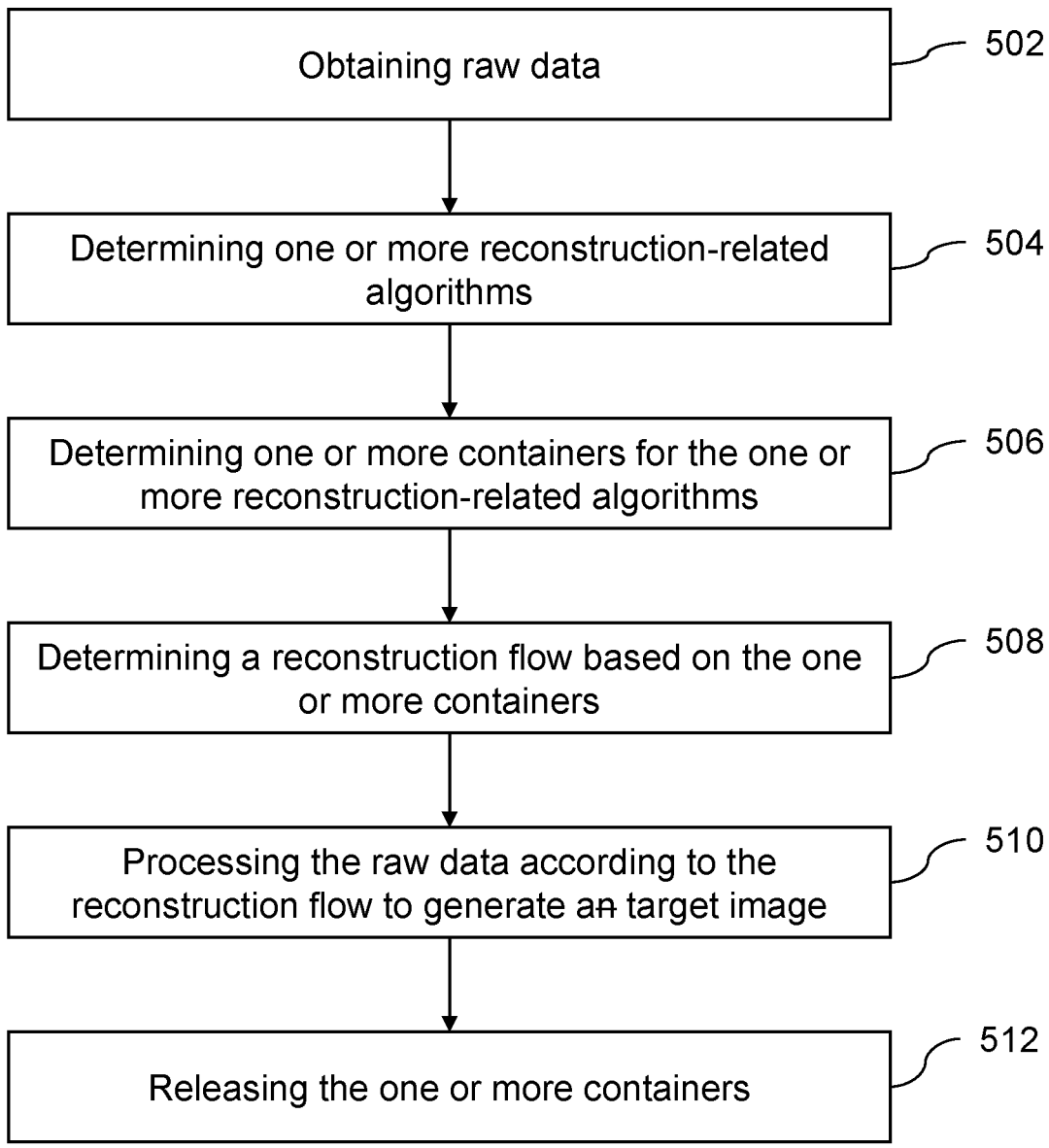
FIG. 5 is a flowchart illustrating an exemplary process for generating a target image according to some embodiments of the present disclosure.

FIG. 5 is a flowchart illustrating an exemplary process for generating a target image according to some embodiments of the present disclosure. The process 500 may be executed by the processing device 140. For example, the process 500 may be implemented as a set of instructions stored in the ROM 230 or the RAM 240. The processor 220 and/or the modules 402-412 illustrated in FIG. 4 may execute the set of instructions, and when executing the instructions, it may be configured to perform the process 500. The operations of the process 500 presented below are intended to be illustrative. In some embodiments, the process 500 may be accomplished with one or more additional operations not described and/or without one or more of the operations discussed. The order in which the operations of the process 500 illustrated in FIG. 5 and described below is not intended to be limiting.

In 502, the processing device 140 (e.g., the acquisition module 402, the interface circuits of the processor 220) may obtain raw data. In some embodiments, the processing device 140 may obtain the raw data from the CT scanner 110 or the storage device 130.

In 504, the processing device 140 (e.g., the algorithm determination module 404, the processing circuits of the processor 220) may determine one or more reconstruction-related algorithms based on the raw data and/or a scan protocol. For example, the processing device 140 may determine the one or more reconstruction-related algorithms based on the object under examination through which the raw data generated. Alternatively or additionally, the processing device 140 may determine the one or more reconstruction-related algorithms based on the scan mode under which the raw data is acquired by scanning an object, such as axial, helical, spiral. In some embodiments, the processing device 140 may determine the one or more reconstruction-related algorithms according to instructions received from a user (e.g., a doctor) through the terminals 150 or the processing device 140.

In 506, the processing device 140 (e.g., the container determination module 406, the processing circuits of the processor 220) may determine one or more containers for the one or more reconstruction-related algorithms determined in 504. For example, the determination of the one or more containers for the one or more reconstruction-related algorithms may include determining a container for each of the one or more reconstruction-related algorithms. As another example, the processing device 140 may determine more than one container for each of the one or more reconstruction-related algorithms. In some embodiments, the processing device 140 may obtain a first reconstruction-related algorithm from the one or more reconstruction-related algorithms and determine a container for the first reconstruction-related algorithm by selecting a container that contains the first reconstruction-related algorithm. Alternatively or additionally, the processing device 140 may generate a new container for the first reconstruction-related algorithm and package the first reconstruction-related algorithm into the newly generated container. Alternatively or additionally, the processing device 140 may obtain an existing container, which may contain another algorithm (e.g., another reconstruction-related algorithm), and replace the algorithm included in the container with the first reconstruction-related algorithm. Details about the determination of the container may be described elsewhere in the present disclosure, e.g., FIGS. 4 and 7 and the descriptions thereof.

In 508, the processing device 140 (e.g., the reconstruction flow determination module 408, the processing circuits of the processor 220) may determine a reconstruction flow based on the one or more containers. It should be noted that an image reconstruction process may need multiple reconstruction-related algorithms. In some embodiments, each of the multiple reconstruction-related algorithms may have at least one function of processing input data of the reconstruction-related algorithm. For example, the reconstruction-related algorithm Air Correction may have a function of processing the raw data. The processing device 140 may process the raw data using these reconstruction-related algorithms in a sequence, e.g., an output of a reconstruction-related algorithm of the one or more reconstruction-related algorithms determined in 504 may be an input of another reconstruction-related algorithm of the one or more reconstruction-related algorithms. The processing device 140 may determine a reconstruction flow by arranging the containers in an order based on the reconstruction-related algorithms. For example, the one or more containers may be linked together in the order to form the reconstruction flow. As another example, some of the one or more containers may be arranged in parallel as described elsewhere in the present disclosure (e.g., FIG. 4 and the description thereof). In some embodiments, the processing device 140 may mark each of the one or more containers using a symbol that represents the order in the reconstruction flow that the container may execute the processing based on the corresponding reconstruction-related algorithm. The symbol may be configured to confirm an inclusion of the container in the reconstruction flow and prevent the container from being included in a second reconstruction flow that is coexistent with and different from the reconstruction flow. In some embodiments, when a container is occupied by a reconstruction flow, the container may not be linked to any other reconstruction flow at the same time. For example, once a container has been linked to a first reconstruction flow, it may not be used in a second reconstruction flow at the same time. Details about the determination of the reconstruction flow may be described elsewhere in the present disclosure (e.g., FIGS. 4 and 9 and the description thereof).

In 510, the processing device 140 (e.g., the processing module 410, the processing circuits of the processor 220) may process, according to the reconstruction flow determined in 508, the raw data obtained in 502 to generate a target image. For example, the processing device 140 may execute, use, load, or occupy the one or more containers of the reconstruction flow according to an order to process the raw data. In some embodiments, the processing device 140 may determine several container groups from the one or more containers of the reconstruction flow and process the data based on the container groups. Details about the processing the raw data to generate a target image may be described elsewhere in the present disclosure (e.g., FIG. 11 and the description thereof).

In 512, the processing device 140 (e.g., the reconstruction flow. determination module 408, the processing circuits of the processor 220) may release the one or more containers from the reconstruction flow determined in 508 after the processing has finished. In some embodiments, the processing device 140 may release a container from a reconstruction flow once the data processing using the container has finished. Alternatively, the processing device 140 may not release any one container from the reconstruction flow until the whole of the reconstruction flow has been finished. In some embodiments, the processing device 140 may release a container group from a reconstruction flow once the data processing using the container group has finished. It should be noted that only after a container and/or a container group has been released from a first reconstruction flow, a second reconstruction flow may use the container. For example, upon the first reconstruction flow ends or finishes, the container and/or the container group used in the first reconstruction flow may be idle, e.g., by changing a symbol of the container and/or the container group. The container and/or the container group may be searched and determined to be used in the second reconstruction flow.

In some embodiments, the processing device 140 may determine whether the target image satisfies a preset condition (e.g., a desired resolution). In response to determining that the target image satisfies the preset condition, the reconstruction flow may terminate. In response to determining that the target image does not satisfy the preset condition, the processing device 140 may generate a new target image automatically or in response to a user instruction. The user instruction may include replacing a portion of the one or more reconstruction-related algorithms by one or more new reconstruction-related algorithms. The one or more reconstruction-related algorithms may include one or more pre-processing algorithms, one or more image creating algorithms, one or more post-processing algorithms, etc. Merely by way of example, the portion of the one or more reconstruction-related algorithms may include the one or more image creating algorithms. The processing device 140 may replace containers containing the one or more image creating algorithms by new containers containing new image creating algorithms. Alternatively, the processing device 140 may replace the one or more image creating algorithms with the new image creating algorithms in the containers to update the containers. Further, the processing device 140 may update the reconstruction flow based on the new image creating algorithms and their corresponding containers. As container(s) containing the pre-processing algorithm(s) are not changed in the updated reconstruction flow, the updated reconstruction flow may directly use intermediate output(s) of the container(s) containing the pre-processing algorithm(s) that have already been generated in a prior run of the reconstruction flow (in which the dissatisfactory target image(s) have been generated) as input(s) of the new containers (or the updated containers). In such occasions, a reconstruction flow may be divided into a plurality of containers and the reconstruction process may be dynamically adjusted by adding/replacing/deleting algorithm(s) contained one or more containers, which improves the reconstruction efficiency. In a traditional reconstruction process, the reconstruction flow may be fixed and static; if any portion of the reconstruction-related algorithms need to be changed, the entire reconstruction flow may need to be performed again for generating a new target image, which is time-consuming and inefficient.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added in the process 500. In the storing operation, the processing device 140 may store information and/or data associated with the reconstruction flow and the containers in a storage device (e.g., the storage device 130, the storage module 412) as described elsewhere in the present disclosure.

Figure 6:
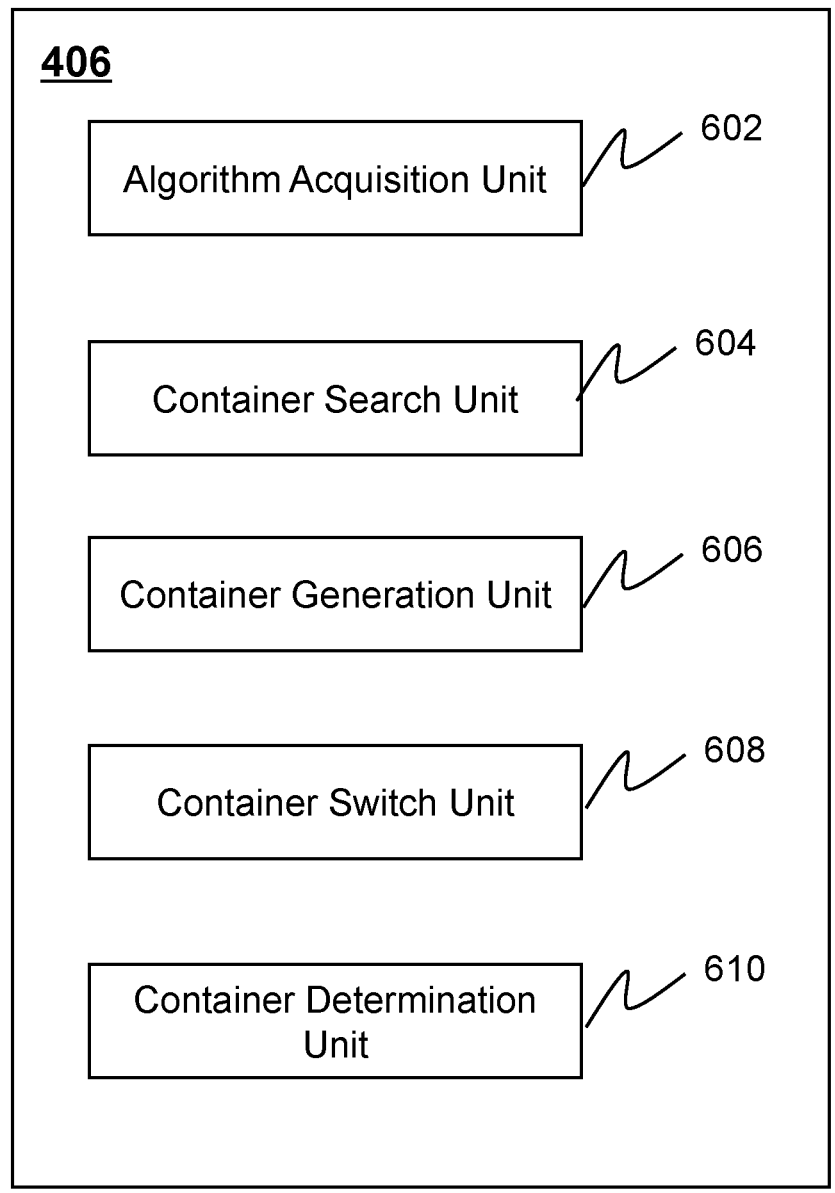
FIG. 6 is a block diagram illustrating an exemplary container determination module according to some embodiments of the present disclosure.

FIG. 6 is a block diagram illustrating an exemplary container determination module according to some embodiments of the present disclosure. The container determination module 406 may include an algorithm acquisition unit 602, a container search unit 604, a container generation unit 606, a container switch unit 608, and a container determination unit 610.

The algorithm acquisition unit 602 may be configured to obtain a reconstruction-related algorithm from the one or more reconstruction-related algorithms determined by processing device 140 (e.g., the algorithm determination module 404). In some embodiments, the algorithm acquisition unit 602 may obtain one reconstruction-related algorithm once a time. In some embodiments, the algorithm acquisition unit 602 may obtain multiple reconstruction-related algorithms once a time.

The container search unit 604 may be configured to search a container containing a reconstruction-related algorithm. For example, the container search unit 604 may search and determine whether there exists a container containing the reconstruction-related algorithm obtained by the algorithm acquisition unit 602. In some embodiments, containers that are not included in any other reconstruction flow are searchable. In some embodiments, the container search unit 604 may search and determine whether there exists a container containing an additional reconstruction-related algorithm other than the reconstruction-related algorithm that is obtained by the algorithm acquisition unit 602 and not included in any other reconstruction flow.

The container generation unit 606 may be configured to generate a container in the processing device 140. In some embodiments, the container generation unit 606 may generate a container containing the reconstruction-related algorithm that is obtained by the algorithm acquisition unit 602. In some embodiments, the container generation unit 606 may generate a container containing a default reconstruction-related algorithm. In some embodiments, the container generation unit 606 may generate a container based on the resource of the processing device 140, such as the processing units and/or the memory available or to be available. More descriptions regarding the generation of a container may be found elsewhere in the present disclosure (e.g., FIG. 4 and the description thereof).

The container switch unit 608 may be configured to switch a first reconstruction-related algorithm to a second reconstruction-related algorithm in a container. That is, the container switch unit 608 may update the container by replacing the first reconstruction-related algorithm contained in the container with the second reconstruction-related algorithm. For example, by disconnecting the container and the first reconstruction-related algorithm, and connecting the container with the second reconstruction-related algorithm, the container switch unit 608 may replace the first reconstruction-related algorithm with the second reconstruction-related algorithm in the container. As used herein, the connecting a container and a reconstruction-related algorithm refers to that the container is used or configured to compile the reconstruction-related algorithm for implementation; and the disconnecting a container and a reconstruction-related algorithm refers to that the container finishes to be used or configured to compile the reconstruction-related algorithm for implementation and becomes idle.

In some embodiments, the container switch unit 608 may obtain a first reconstruction-related algorithm that is obtained by the algorithm acquisition unit 602, and obtain an existing container containing a second reconstruction-related algorithm that is determined by the container search unit 604. In some embodiments, the second reconstruction-related algorithm may be a reconstruction-related algorithm that is different from the first reconstruction-related algorithm. The container switch unit 608 may replace the second reconstruction-related algorithm with the first reconstruction-related algorithm. In some embodiments, the container switch unit 608 may obtain the first reconstruction-related algorithm that obtained by the algorithm acquisition unit 602, and obtain a container containing a default reconstruction-related algorithm that is generated by the container generation unit 606. The container switch unit 608 may replace the default reconstruction-related algorithm with the first reconstruction-related algorithm.

The container determination unit 610 may be configured to determine a container for the reconstruction-related algorithm. For example, the container determination unit 610 may determine an existing container as the container for the first reconstruction-related algorithm on an occurrence that the container search unit 604 determines that the existing container contains the reconstruction-related algorithm and is not connected to any other reconstruction flow. In some embodiments, after the container switch unit 608 has replaced an additional reconstruction-related algorithm contained in a container with the reconstruction-related algorithm, the container determination unit 610 may determine the container after replacement as the container for the first reconstruction-related algorithm. In some embodiments, the container determination unit 610 may determine a container generated by the container generation unit 606 as the container for the first reconstruction-related algorithm. Details about the determination of the container may be described elsewhere in the present disclosure (e.g., FIGS. 4 and 7 and the description thereof).

The units (e.g., the algorithm acquisition unit 602, the container search unit 604, the container generation unit 606, the container switch unit 608, the container determination unit 610) of the container determination module 406 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined into a single unit, and any one of the units may be divided into two or more sub-units. For example, the algorithm acquisition unit 602 and the container generation unit 606 may be combined into a single unit that may both obtain a first reconstruction-related algorithm from the one or more reconstruction-related algorithms and generate a container for the first reconstruction-related algorithm. As another example, the container determination module 406 may include a storage unit (not shown) used to store information and/or data associated with the reconstruction-related algorithm.

Figure 7:
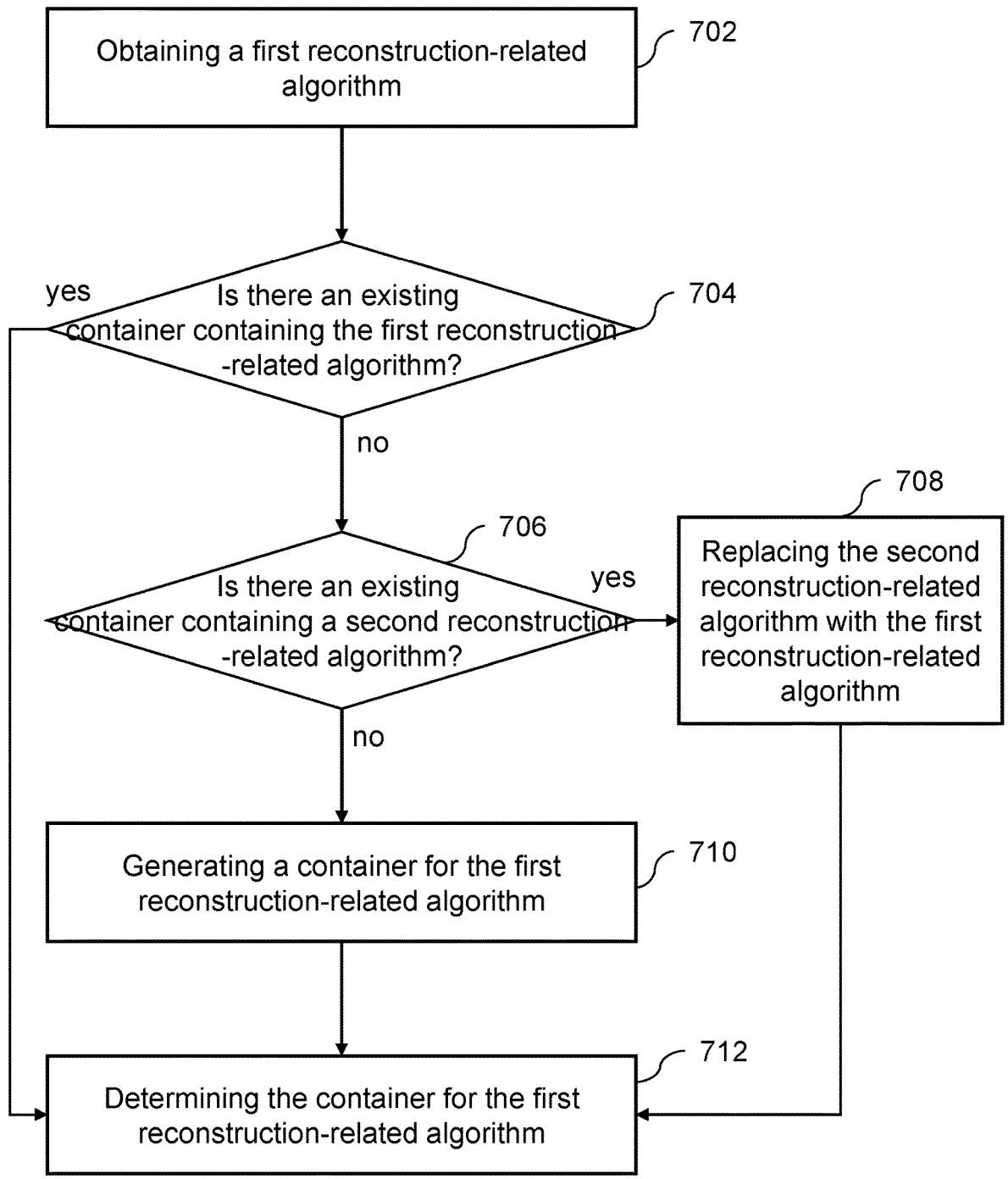
FIG. 7 is a flowchart illustrating an exemplary process for determining a container for a reconstruction-related algorithm according to some embodiments of the present disclosure.

FIG. 7 is a flowchart illustrating an exemplary process for determining a container for a reconstruction-related algorithm according to some embodiments of the present disclosure. The process 700 may be executed by the processing device 140. For example, the process 700 may be implemented as a set of instructions stored in the ROM 230 or the RAM 240. The processor 220 and/or the units 602-610 illustrated in FIG. 6 may execute the set of instructions, and when executing the instructions, it may be configured to perform the process 700. The operations of the process 700 presented below are intended to be illustrative. In some embodiments, the process 700 may be accomplished with one or more additional operations not described and/or without one or more of the operations discussed. Additionally, the order in which the operations of the process illustrated in FIG. 7 and described below is not intended to be limiting. In some embodiments, at least part of the operation 506 of the process 500 may be performed according to the process 700.

In 702, the processing device 140 (e.g., the algorithm acquisition unit 602, the interface circuits of the processor 220) may obtain a first reconstruction-related algorithm from the one or more reconstruction-related algorithms determined by the algorithm determination module 404. The first reconstruction-related algorithm used herein may represent any one of the one or more reconstruction-related algorithms.

In 704, the processing device 140 (e.g., the container search unit 604, the processing circuits of the processor 220) may determine whether there is an existing container containing the first reconstruction-related algorithm obtained in 702 by searching the imaging system 100 (e.g., storage device 130, processing device 140, or terminal 150). It should be noted that there may be a plurality of containers (e.g., a container pool) in the imaging system 100, and each of the containers may contain a reconstruction-related algorithm. If there is such a container and the container is not connected to any other reconstruction flow, the process 700 may proceed to operation 712. Otherwise, the process 700 may proceed to operation 706.

In 706, the processing device 140 (e.g., the container search unit 604, the processing circuits of the processor 220) may determine whether there is a container containing a second reconstruction-related algorithm by searching in the imaging system 100 (e.g., storage device 130, processing device 140, or terminal 150). It should be noted that the second reconstruction-related algorithm used herein may be any reconstruction-related algorithm other than the first reconstruction-related algorithm. If there is such a container and the container is not connected to any other reconstruction flow, the process 700 may proceed to 708. Otherwise, the process 700 may proceed to 710. In some embodiments, each container may be marked with a symbol (e.g., a sequence number) based on the position in the reconstruction flow that the container processes the input data. For example, a container PRE-1-1 processing the raw data may be marked with 0101, and a container IC-1-1 processing the output data of the PRE-1-1 container may be marked with 0102, etc. Once a container has been marked with a symbol, which means the container has been included in a reconstruction flow (e.g., the first reconstruction flow), it may not be used in a second reconstruction flow at the same time. That is, the symbol may be configured to confirm an inclusion of the container in the reconstruction flow and prevent the container from being included in a second reconstruction flow that is coexistent with and different from the reconstruction flow.

In 708, the processing device 140 (e.g., the container switch unit 608, the processing circuits of the processor 220) may obtain the container containing the second reconstruction-related algorithm and then replace the second reconstruction-related algorithm with the first reconstruction-related algorithm. Thus, the container containing the second reconstruction-related algorithm may be switched into a container containing the first reconstruction-related algorithm.

In 710, the processing device 140 (e.g., the container generation unit 606, the processing circuits of the processor 220) may generate a container for the first reconstruction-related algorithm. In some embodiments, the container generation unit 606 may generate a container containing any reconstruction-related algorithm, such as a default reconstruction-related algorithm. The default reconstruction-related algorithm may be different from the first reconstruction-related algorithm. The processing device 140 (e.g., the container switch unit 608, the processing circuits of the processor 220) may replace the default reconstruction-related algorithm with the first reconstruction-related algorithm as described in 708. In some embodiments, the container generation unit 606 may generate a container containing the first reconstruction-related algorithm. More description regarding the generation of a container may be found elsewhere in the present disclosure (e.g., FIG. 4 and the description thereof).

In 712, the processing device 140 (e.g., the container determination unit 610, the processing circuits of the processor 220) may determine the container for the first reconstruction-related algorithm. For example, on the occurrence that there is a container containing the first reconstruction-related algorithm (i.e., the "yes" arrow out of 706), and in 712, the processing device 140 may determine the container for the first reconstruction-related algorithm. In some embodiments, the process 700 may proceed to operation 712 from operation 708, and the processing device 140 may determine the switched container for the first reconstruction-related algorithm. In some embodiments, the process 700 may proceed to operation 712 from operation 710, and the processing device 140 may determine the generated container for the first reconstruction-related algorithm.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 700. In the storing operation, the processing device 140 may store information and/or data associated with the reconstruction-related algorithms and the containers in a storage device (e.g., the storage device 130, the storage module 412) described elsewhere in the present disclosure. In some embodiments, operation 704 may be omitted, and the process 700 may proceed to operation 706 from operation 702. In some embodiments, operations 706 and 708 may be omitted, and the process 700 may proceed to operation 710 from operation 704, on the occurrence that the determination in 704 is no. In some embodiments, operations 704, 706, and 708 may be omitted, and the process 700 may proceed to operation 710 from operation 702. Besides, for persons having ordinary skills in the art, it should be noted that the process 700 is merely provided for illustrating the determination of a container for a reconstruction-related algorithm. Thus, in the determination of the one or more containers for the one or more reconstruction-related algorithms, the process 700 may repeatedly be performed. Moreover, each determination of the container for a reconstruction-related algorithm (i.e., each execution of the process 700) may use different processes of the multiple variations and modifications described above.

Figure 8:
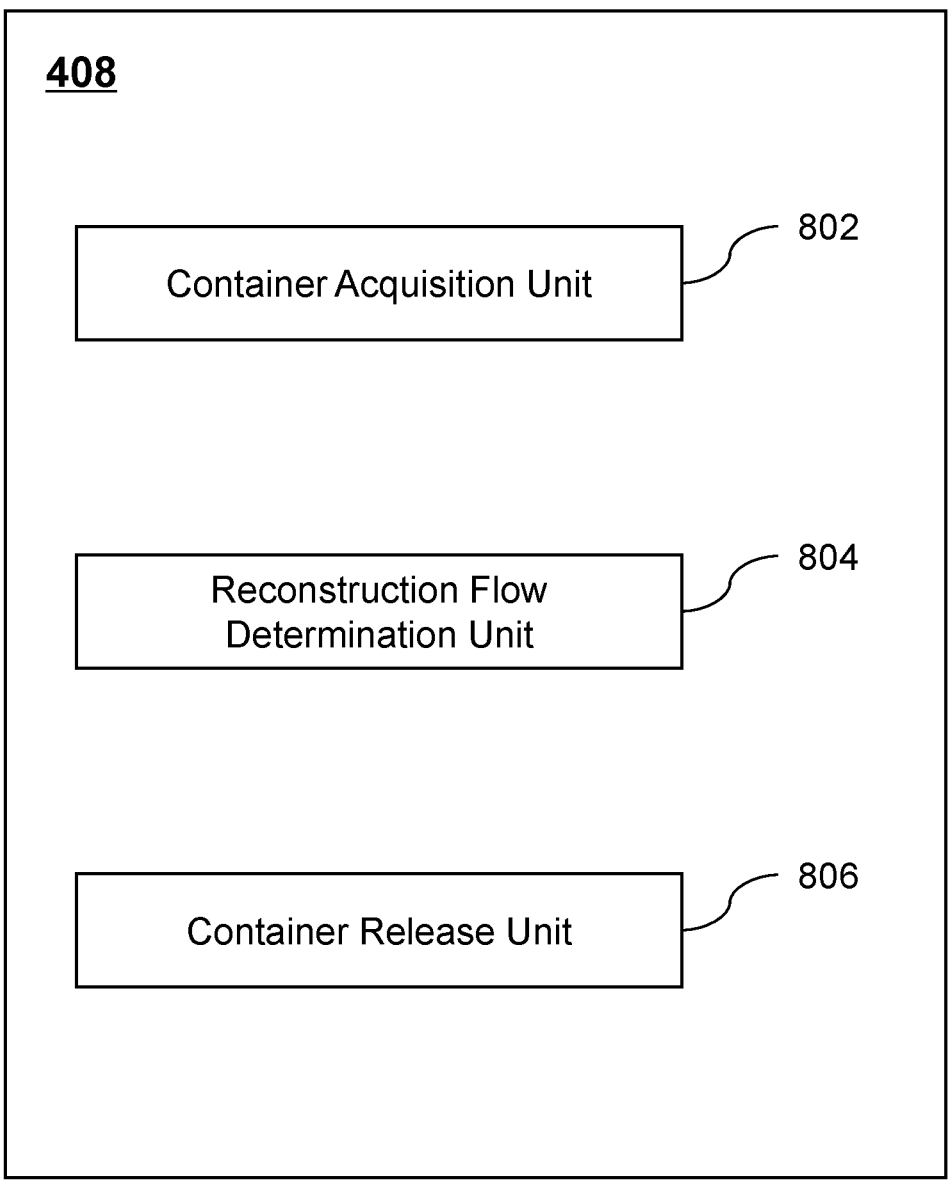
FIG. 8 is a block diagram illustrating an exemplary reconstruction flow determination module according to some embodiments of the present disclosure.

FIG. 8 is a block diagram illustrating an exemplary reconstruction flow determination module according to some embodiments of the present disclosure. The reconstruction flow determination module 408 may include a container acquisition unit 802, a reconstruction flow determination unit 804, and a container release unit 806.

The container acquisition unit 802 may be configured to obtain one or more containers that are determined by the container determination module 406.

The reconstruction flow determination unit 804 may be configured to determine a reconstruction flow by arranging the one or more containers in an order based on the reconstruction-related algorithms included in the containers. Each of the containers may have input data, and the containers may process the input data according to the contained reconstruction-related algorithm, and generate output data. In some embodiments, a container's output data may be another container's input data. In some embodiments, the reconstruction flow determination unit 804 may mark each container with a symbol (e.g., a sequence number) based on the position in the order that the container processes the input data. For example, a container PRE-1-1 processing the raw data may be marked with 0101, and a container IC-1-1 processing the output data of the PRE-1-1 container may be marked with 0102, etc. A container may only be included in one reconstruction flow at a time. For example, once a container has been marked with a symbol, which means the container has been included in a reconstruction flow (e.g., the first reconstruction flow), it may not be used in a second reconstruction flow at the same time. That is, the symbol may be configured to confirm an inclusion of the container in the reconstruction flow and prevent the container from being included in a second reconstruction flow that is coexistent with and different from the reconstruction flow.

A reconstruction flow may be performed by the processing device 140 to reconstruct an image based on raw data. For example, the processing device 140 may run the reconstruction flow by executing the one or more containers according to the order to process the raw data and generate a target image.

The container release unit 808 may be configured to release one or more containers from a reconstruction flow. In some embodiments, the container release unit 808 may release the container from a reconstruction flow after the processing of the container has finished. Alternatively or additionally, the container release unit 808 may release all containers from a reconstruction flow after the image reconstruction has finished, e.g., after a target image has been reconstructed.

The units (e.g., the container acquisition unit 802, the reconstruction flow determination unit 804, the container release unit 806) of the reconstruction flow determination module 408 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined into a single unit, and any one of the units may be divided into two or more sub-units. For example, the container acquisition unit 802 and the reconstruction flow determination unit 804 may be combined into a single unit that may both obtain one or more containers and arrange the one or more containers in an order. As another example, the reconstruction flow determination module 408 may include a storage unit (not shown) used to store information and/or data associated with the one or more containers.

Figure 9:
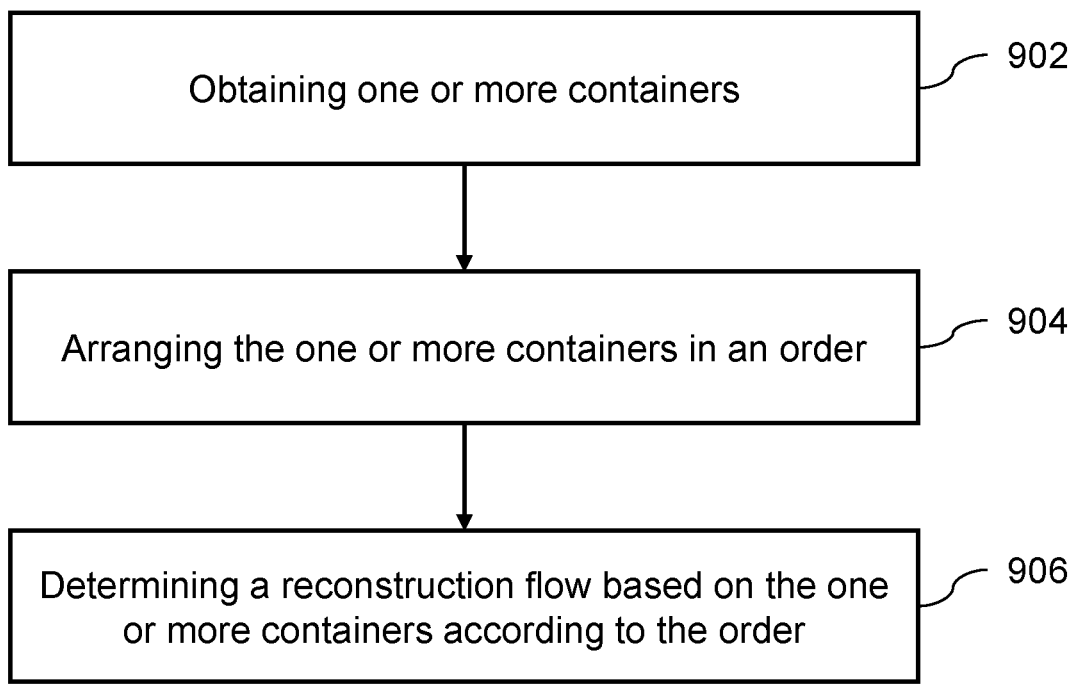
FIG. 9 is a flowchart illustrating an exemplary process for determining a reconstruction flow according to some embodiments of the present disclosure.

FIG. 9 is a flowchart illustrating an exemplary process for determining a reconstruction flow according to some embodiments of the present disclosure. The process 900 may be executed by the processing device 140. For example, the process 900 may be implemented as a set of instructions stored in the ROM 230 or the RAM 240. The processor 220 and/or the units 802-806 illustrated in FIG. 8 may execute the set of instructions, and when executing the instructions, it may be configured to perform the process 900. The operations of the process 900 presented below are intended to be illustrative. In some embodiments, the process 900 may be accomplished with one or more additional operations not described and/or without one or more of the operations discussed. Additionally, the order in which the operations of the process illustrated in FIG. 9 and described below is not intended to be limiting. In some embodiments, the operation 508 may be performed according to the process 900.

In 902, the processing device 140 (e.g., the container acquisition unit 802, the interface circuits of the processor 220) may obtain one or more containers that are determined by the container determination module 406.

In 904, the processing device 140 (e.g., the reconstruction flow determination unit 804, the processing circuits of the processor 220) may arrange the one or more containers in an order based on the reconstruction-related algorithms included in the containers. Each of the containers may receive input data, and the containers may process the input data according to the contained reconstruction-related algorithm, and generate output data. In some embodiments, a container's output data may be another container's input data. The reconstruction flow determination unit 804 may mark each container with a symbol (e.g., a sequence number) based on the position in the sequence that the container processes the input data. The symbol may be configured to confirm an inclusion of the container in the reconstruction flow and prevent the container from being included in a second reconstruction flow that is coexistent with and different from the reconstruction flow. For example, a container PRE-1-1 processing the raw data may be marked with 0101, and a container IC-1-1 processing the output data of the PRE-1-1 container may be marked with 0102, etc. Merely by way of example, the one or more containers may include a first container PRE-1-1 containing reconstruction-related algorithm Air Correction, a second container IC-1-1 containing reconstruction-related algorithm FBP algorithm, and a third container POST-1-1 containing reconstruction-related algorithm Image Filter. The input of the first container PRE-1-1 is the raw data, and output is image data. For example, the reconstruction-related algorithm Air Correction may be executed to correct the raw data. As used herein, the image data may represent a corrected raw data, or data used to generate a target image directly. The input of the second container IC-1-1 is the image data (i.e., the output of the first container PRE-1-1 containing reconstruction-related algorithm Air Correction), and the output is a preliminary image (e.g., reconstruction-related algorithm FBP algorithm may be executed to create an image). As used herein, the preliminary image may represent an image generated from the image data without any post-processing. The input of the third container POST-1-1 is the preliminary image generated according to the second container IC-1-1 containing reconstruction-related algorithm FBP algorithm, and the output is a target image (e.g., the third container POST-1-1 containing reconstruction-related algorithm Image Filter may be executed to post-process the preliminary image). As used herein, the target image may represent an image that a user (e.g., a doctor) needs. The processing device 140 may mark the first container PRE-1-1 with symbol 0101, the second container IC-1-1 with symbol 0102, and the third container POST-1-1 with symbol 0103.

In 906, the processing device 140 (e.g., the reconstruction flow determination unit 804, the processing circuits of the processor 220) may determine a reconstruction flow based on the one or more containers according to the order arranged in 904. A container may only be included in one reconstruction flow at a time. For example, once a container has been marked with a symbol which means the container has been included in a first reconstruction flow, it may not be used in a second reconstruction flow. That is, the symbol may be configured to confirm an inclusion of the container in the reconstruction flow and prevent the container from being included in a second reconstruction flow that is coexistent with and different from the reconstruction flow. In other words, the container included in the first reconstruction flow may only process the data associated with the raw data. Merely by way of example, the processing device 140 may determine the reconstruction flow including the first container PRE-1-1 containing reconstruction-related algorithm Air Correction, the second container IC-1-1 containing reconstruction-related algorithm FBP algorithm, and the third container POST-1-1 containing reconstruction-related algorithm Image Filter, and according to the order of 0101-0102-0103.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 900. In the storing operation, the processing device 140 may store information and/or data associated with the one or more containers in a storage device (e.g., the storage 140) described elsewhere in the present disclosure.

Figure 10:
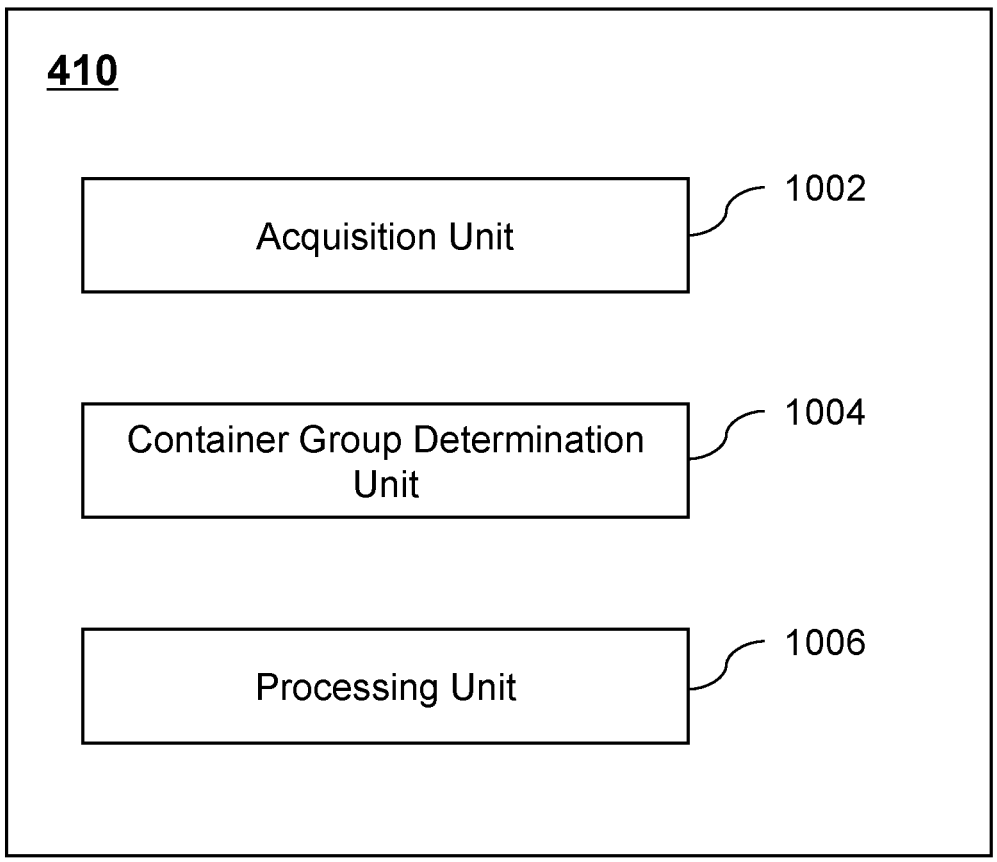
FIG. 10 is a block diagram illustrating an exemplary processing module according to some embodiments of the present disclosure.

FIG. 10 is a block diagram illustrating an exemplary processing module according to some embodiments of the present disclosure. The processing module 410 may include an acquisition unit 1002, a container group determination unit 1004, and a processing unit 1006.

The acquisition unit 1002 may be configured to obtain raw data and/or a reconstruction flow from, for example, the storage module 412 of the processing device 140. In some embodiments, the reconstruction flow may include one or more containers arranged in an order.

The container group determination unit 1004 may be configured to determine a container group from the one or more containers of the reconstruction flow. A container group may include at least one container. The at least one container may be executed continuously in the reconstruction flow. In some embodiments, the container group determination unit 1004 may determine a container group including at least one container based on the function of the reconstruction-related algorithms included therein. Alliteratively, some containers of the container group may operate in parallel (e.g., concurrently) as described elsewhere in the present disclosure (e.g., FIG. 4 and the description thereof).

In some embodiments, the container group determination unit 1004 may determine a first container group by selecting at least one container from the one or more containers of a reconstruction flow. For example, the at least one container in the first container group may be executed to pre-process the raw data to generate image data. Alternatively or additionally, the container group determination unit 1004 may further determine a second container group by selecting at least one container from the one or more containers of the reconstruction flow. For example, the at least one container in the second container group may be executed to process the image data generated using the first container group to generate a target image. In some embodiments, some of the different container groups may operate in parallel (e.g., concurrently) as described elsewhere in the present disclosure (e.g., FIG. 4 and the description thereof).

In some embodiments, the second container group may include container(s) for image creating and container(s) for post-processing. The container group determination unit 1004 may further determine a third container group and a fourth container group from the second container group. At least one of the third container group or the fourth container group may include a container from the at least one container of the second container group. The at least one container in the third container group may be executed to process the image data generated by the first container group to generate a preliminary image. The at least one container in the fourth container group may be executed to process the preliminary image generated by the third container group to generate the target image. Accordingly, a reconstruction flow may be generated by arranging the first container group, the second container group, and the third container group in series. During the reconstruction flow, the first container group may be used for pre-processing to process the raw data to generate the image data; the third container group may be used for image creating to process the image data to generate the preliminary image; and the fourth container group may be used for post-processing to process the preliminary image to generate the target image. In some embodiments, the reconstruction flow may be generated based on all containers in the first container group, the second container group and the third container group, without dividing the containers into the first container group, the second container group, and/or the third containing group.

It should be noted that a reconstruction flow may include one or more process, such as a pre-process for the raw data, an image creating process for the pre-processed data, e.g., the image data. In some embodiments, the reconstruction flow may further include a post-process, e.g., a process for an image generated by the process for the image data, e.g., the preliminary image. A container group may correspond to at least one process of the reconstruction flow.

The processing unit 1006 may be configured to process data using the one or more containers determined by the container determination module 406. Alternatively or additionally, the processing unit 1006 may process data using the container group determined by the reconstruction flow determination unit 804.

The units (e.g., the acquisition unit 1002, the container group determination unit 1004, the processing unit 1006) of the processing module 410 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined into a single unit, and any one of the units may be divided into two or more sub-units. For example, the acquisition unit 1002 and the container group determination unit 1004 may be combined into a single unit that may both obtain a reconstruction flow and determine one or more container groups from the one or more containers. As another example, the processing module 410 may include a storage unit (not shown) used to store information and/or data associated with the one or more container groups.

Figure 11:
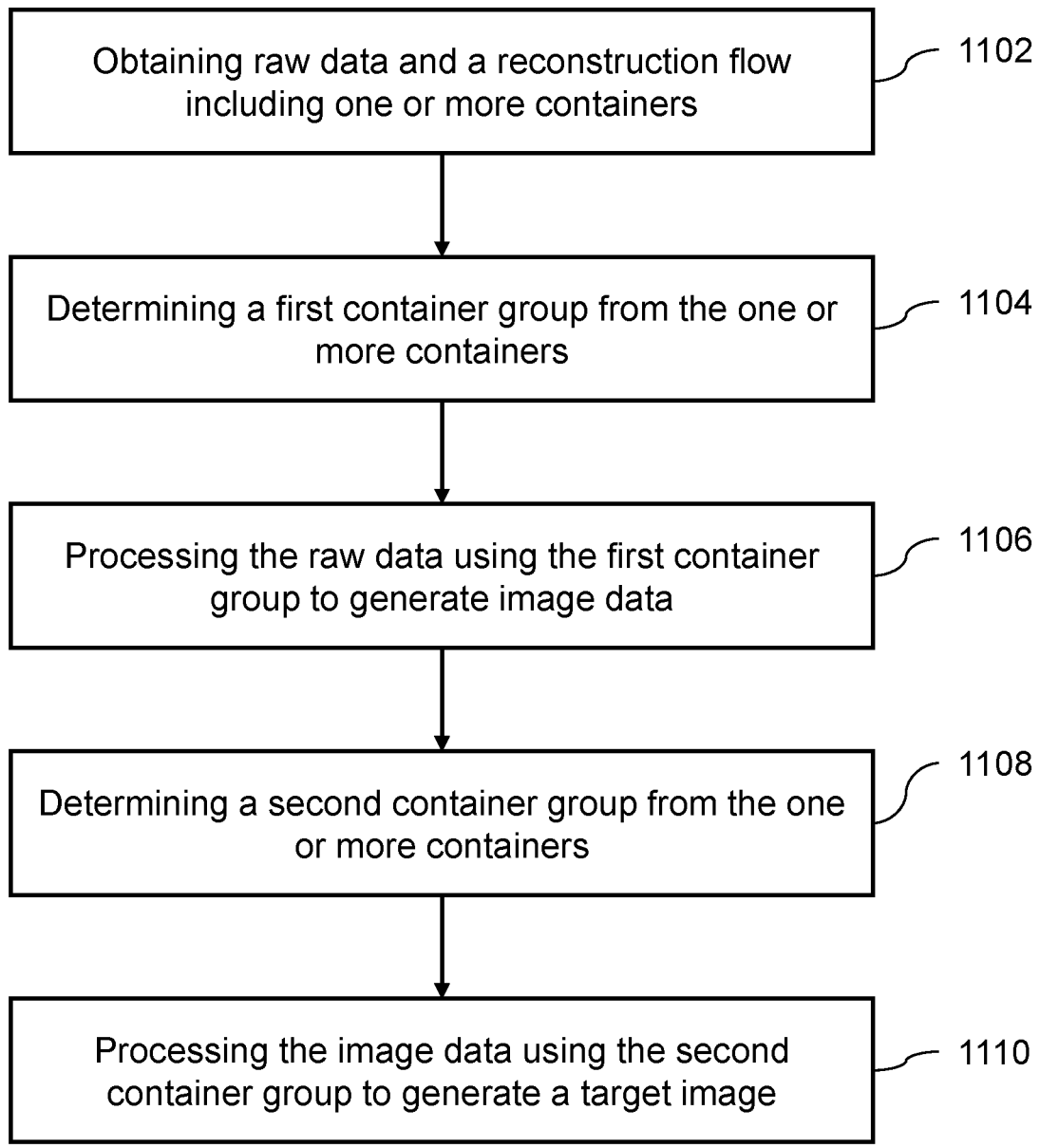
FIG. 11 is a flowchart illustrating an exemplary process for processing raw data to generate a target image according to some embodiments of the present disclosure.

FIG. 11 is a flowchart illustrating an exemplary process for processing raw data to generate a target image according to some embodiments of the present disclosure. The process 1100 may be executed by the processing device 140. For example, the process 1100 may be implemented as a set of instructions stored in the ROM 230 or the RAM 240. The processor 220 and/or the units 1002-1006 illustrated in FIG. 10 may execute the set of instructions, and when executing the instructions, it may be configured to perform the process 1100. The operations of the process 1100 presented below are intended to be illustrative. In some embodiments, the process 1100 may be accomplished with one or more additional operations not described and/or without one or more of the operations discussed. Additionally, the order in which the operations of the process illustrated in FIG. 11 and described below is not intended to be limiting. In some embodiments, the operation 510 of the process 500 may be performed according to the process 1100.

In 1102, the processing device 140 (e.g., the acquisition unit 1002, the interface circuits of the processor 220) may obtain raw data and a reconstruction flow. The reconstruction flow may include one or more containers. In some embodiments, the acquisition unit 1002 may obtain the raw data from the acquisition module 402 and the reconstruction flow determined by the reconstruction flow determination module 408. In some embodiments, the raw data and/or the reconstruction flow may be stored in the storage module 412.

In 1104, the processing device 140 (e.g., the container group determination unit 1004, the processing circuits of the processor 220) may determine a first container group from the one or more containers of the reconstruction flow. The first container group may include at least one container. In some embodiments, the processing device 140 may determine the first container group by selecting at least one container from the one or more containers based on the reconstruction-related algorithm included in the container. For example, the first container group may include containers for pre-processing the raw data and generating image data (e.g., the container PRE-1-1 contains reconstruction-related algorithm Air Correction).

In 1106, the processing device 140 (e.g., the processing unit 1006, the processing circuits of the processor 220) may process the raw data using the first container group to generate image data. In some embodiments, the containers in the first container group may be executed one by one to process the raw data. In some embodiments, the image data may include pre-processed raw data, such as corrected raw data.

In 1108, the processing device 140 (e.g., the container group determination unit 1004, the processing circuits of the processor 220) may determine a second container group from the one or more containers of the reconstruction flow. The second container group may include at least one container. In some embodiments, the processing device 140 may determine the second container group by selecting at least one container from the one or more containers based on the reconstruction-related algorithm included in the container. For example, the second container group may include at least one container for image creating from the image data (e.g., the container IC-1-1 containing reconstruction-related algorithm FBP algorithm). As another example, the second container group may further include at least one container for post-processing to a preliminary image (e.g., the container POST-1-1 containing reconstruction-related algorithm Image Filter). In some embodiments, the second container group may include all containers of the reconstruction flow except the containers in the first container group. In some embodiments, one container of the reconstruction flow may only be determined in only one container group.

In 1110, the processing device 140 (e.g., the processing unit 1006, the processing circuits of the processor 220) may process the image data using the second container group to generate a target image. In some embodiments, the containers in the second container group may be executed one by one to process the image data.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added into the process 1100. In the storing operation, the processing device 140 may store information and/or data associated with the image data and/or image in a storage device (e.g., the storage 140) described elsewhere in the present disclosure. For another example, the first container group may further include at least one container for image creating, such as container IC-1-1 containing reconstruction-related algorithm FBP algorithm, and the second container group may include at least one container for post-processing, such as container POST-1-1 containing reconstruction-related algorithm Image Filter. The processing device 140 may execute the first container group to process the raw data to generate an intermediate image. Moreover, the processing device 140 may process the intermediate image using the second container group to generate the target image.

Figure 12:
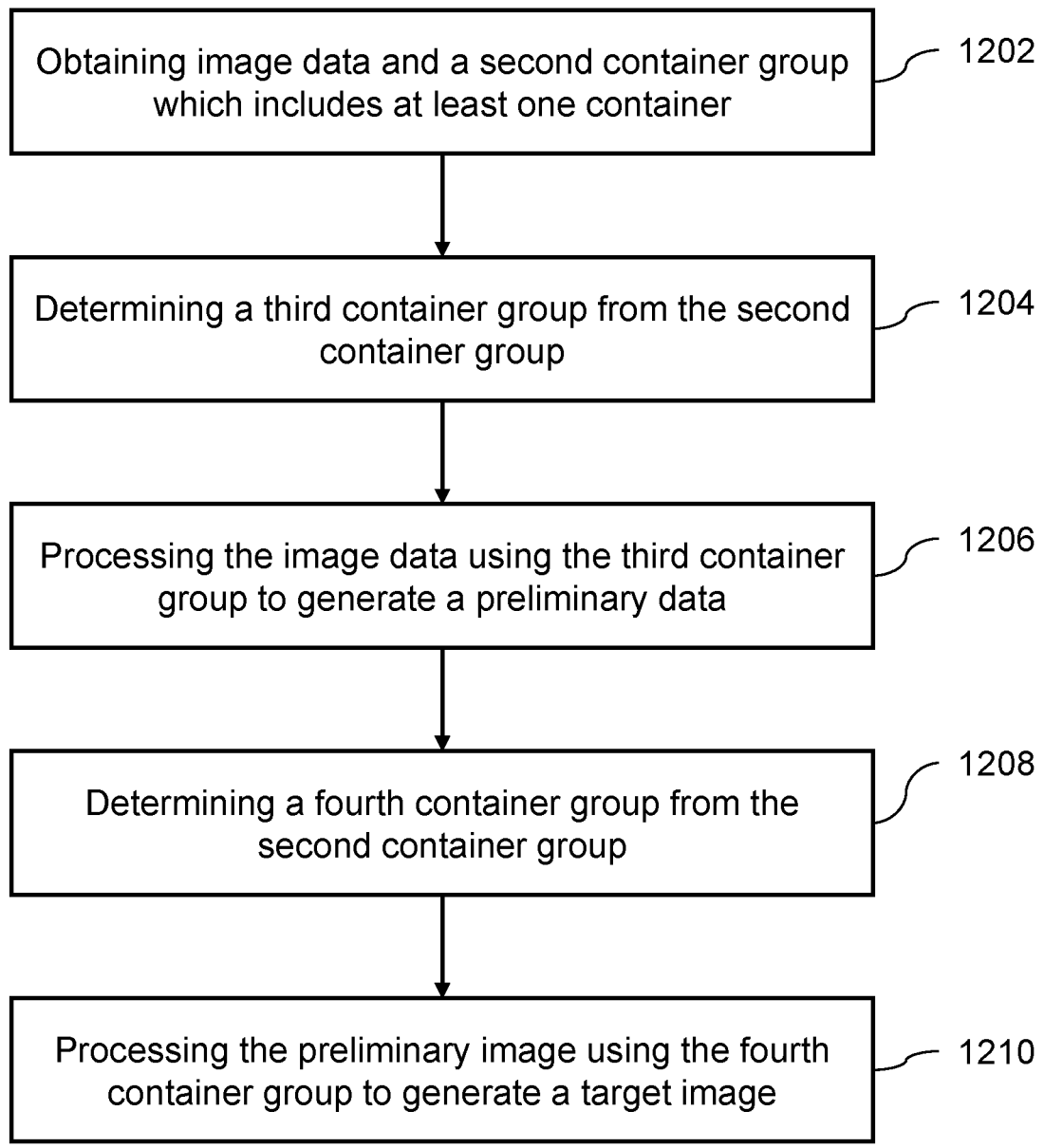
FIG. 12 is a flowchart illustrating an exemplary process for processing image data to generate a target image according to some embodiments of the present disclosure.

FIG. 12 is a flowchart illustrating an exemplary process for processing image data to generate a target image according to some embodiments of the present disclosure. The process 1200 may be executed by the processing device 140. For example, the process 1200 may be implemented as a set of instructions stored in the ROM 230 or the RAM 240. The processor 220 and/or the units 1002-1006 illustrated in FIG. 10 may execute the set of instructions, and when executing the instructions, it may be configured to perform the process 1200. The operations of the process 1200 presented below are intended to be illustrative. In some embodiments, the process 1200 may be accomplished with one or more additional operations not described and/or without one or more of the operations discussed. Additionally, the order in which the operations of the process illustrated in FIG. 12 and described below is not intended to be limiting. In some embodiments, the operation 1110 of the process 1100 may be performed according to the process 1200.

In 1202, the processing device 140 (e.g., the acquisition unit 1002, the interface circuits of the processor 220) may obtain image data and a second container group of a reconstruction flow. The second container group may include at least one container. In some embodiments, the acquisition unit 1002 may obtain the image data from the processing unit 1006 and the second container group of the reconstruction flow from the container group determination unit 1004. In some embodiments, the raw data and/or the reconstruction flow may be stored in the storage module 412.

In 1204, the processing device 140 (e.g., the container group determination unit 1004, the processing circuits of the processor 220) may determine a third container group from the at least one container of the second container group. The third container group may include at least one container. In some embodiments, the processing device 140 may determine the third container group by selecting at least one container from the one or more containers based on the reconstruction-related algorithm included in the container. For example, the third container group may include at least one container for image creating from the image data (e.g., the container IC-1-1 containing reconstruction-related algorithm FBP algorithm).

In 1206, the processing device 140 (e.g., the processing unit 1006, the processing circuits of the processor 220) may process the image data using the third container group to generate a preliminary image. In some embodiments, the containers in the third container group may be executed one by one to process the image data. In some embodiments, the preliminary image may include an image generated from the image data without post-process.

In 1208, the processing device 140 (e.g., the container group determination unit 1004, the processing circuits of the processor 220) may determine a fourth container group from the at least one container of the second container group. The fourth container group may include at least one container. In some embodiments, the processing device 140 may determine the fourth container group by selecting at least one container from the at least one container in the second container group based on the reconstruction-related algorithm included in the container. For example, the fourth container group may include at least one container for post-processing to the preliminary image (e.g., the container POST-1-1 containing reconstruction-related algorithm Image Filter). Alternatively or additionally, the fourth container group may include all containers in the second container group except the containers in the third container group. In some embodiments, a container of the reconstruction flow may be included in only one container group.

In 1210, the processing device 140 (e.g., the processing unit 1006, the processing circuits of the processor 220) may process the preliminary image using the fourth container group to generate a target image. In some embodiments, the containers in the fourth container group may be executed one by one to process the preliminary image to generate the target image.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added into the process 1200. In the storing operation, the processing device 140 may store information and/or data associated with the preliminary image and/or image in a storage device (e.g., the storage 140) described elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer-readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
a storage device storing a set of instructions; and at least one processor in communication with the storage device, wherein when executing the set of instructions, the at least one processor is configured to cause the system to perform operations including:
    obtaining raw data generated by scanning an object;
    determining multiple reconstruction-related algorithms;
    determining multiple containers for executing the multiple reconstruction-related algorithms, each of the multiple containers containing at least one of the multiple reconstruction-related algorithms;
    determining a reconstruction flow by arranging the multiple containers in an order based on the multiple reconstruction-related algorithms contained in the multiple containers;
    for each container of the multiple containers:
        determining, by the container, a hardware resource that is idle from a plurality of hardware resources, wherein the plurality of hardware resources take instructions in different computer languages; and
        compiling, by the container, the reconstructed-related algorithm contained in the container to a computer language format understandable by the hardware resource; and
    processing the raw data according to the reconstruction flow to generate a target image by executing the multiple containers arranged in the order.

2. The system of claim 1, wherein the determining multiple containers for executing the multiple reconstruction-related algorithms includes:
    for each of at least one of the multiple reconstruction-related algorithms,
        determining a container for the reconstruction-related algorithm; and
        configurating the container for implementing the reconstruction algorithm according to specifications of the reconstruction-related algorithm.

3. The system of claim 2, wherein the specifications of the reconstruction-related algorithm include at least one of a content of the reconstructed-related algorithm, an amount of resource that the reconstruction-related algorithm needs to utilize corresponding to different hardware resources, or a next reconstruction-related algorithm needs to be used after the reconstruction-related algorithm.

4. The system of claim 2, wherein the specifications of the reconstruction-related algorithm are a portion of the reconstruction-related algorithm.

5. The system of claim 1, wherein the determining multiple containers for executing the multiple reconstruction-related algorithms includes:
    for one of the multiple reconstruction-related algorithms,
        determining whether there is an existing container containing the reconstruction-related algorithm;
        in response to determining there is no existing container containing the reconstruction-related algorithm, determining whether there is a container containing a second reconstruction-related algorithm; and
        in response to determining that there is the container containing the second reconstruction-related algorithm, replacing the second reconstruction-related algorithm in the container with the first reconstruction-related algorithm.

6. The system of claim 1, wherein for at least some of the multiple containers arranged in the order, an output of a container is an input of a subsequent container according to the order.

7. The system of claim 1, wherein the processing the raw data according to the reconstruction flow to generate a target image includes:
    determining a first container group from the multiple containers, the first container group including at least one container;
    processing the raw data using the first container group to generate image data;
    determining a second container group from the multiple containers, the second container group including at least one container; and
    processing the image data using the second container group to generate the target image.

8. The system of claim 7, wherein the processing the image data using the second container group to generate the target image includes:
    determining a third container group from the second container group, the third container group including at least one container;
    processing the image data using the third container group to generate a preliminary image;
    determining a fourth container group from the second container group, the fourth container group including at least one container; and
    processing the preliminary image using the fourth container group to generate the target image.

9. The system of claim 1, wherein some of the multiple containers are operated in parallel.

10. The system of claim 1, wherein each of at least one of the multiple containers receive an input from at least one container.

11. The system of claim 1, wherein the at least one processor is further configured to cause the system to perform operations:
    modifying one or more containers of the multiple containers by modifying one or more reconstruction-related algorithms of the multiple reconstruction-related algorithms;
    re-performing the reconstruction flow from the modified one or more containers.

12. A method, comprising:
    obtaining raw data generated by scanning an object;
    determining multiple reconstruction-related algorithms;
    determining multiple containers for executing the multiple reconstruction-related algorithms, each of the multiple containers containing at least one of the multiple reconstruction-related algorithms;
    determining a reconstruction flow by arranging the multiple containers in an order based on the multiple reconstruction-related algorithms contained in the multiple containers;
    for each container of the multiple containers:
        determining, by the container, a hardware resource that is idle from a plurality of hardware resources, wherein the plurality of hardware resources take instructions in different computer languages; and
        compiling, by the container, the reconstructed-related algorithm contained in the container to a computer language format understandable by the hardware resource; and
    processing the raw data according to the reconstruction flow to generate a target image by executing the multiple containers arranged in the order.

13. The method of claim 12, wherein the determining multiple containers for executing the multiple reconstruction-related algorithms includes:

for each of at least one of the multiple reconstruction-related algorithms,
   determining a container for the reconstruction-related algorithm; and
   configurating the container for implementing the reconstruction algorithm according to specifications of the reconstruction-related algorithm.

14. The method of claim 13, wherein the specifications of the reconstruction-related algorithm include at least one of a content of the reconstructed-related algorithm, an amount of resource that the reconstruction-related algorithm needs to utilize corresponding to different hardware resources, or a next reconstruction-related algorithm needs to be used after the reconstruction-related algorithm.

15. The method of claim 13, wherein the specifications of the reconstruction-related algorithm are a portion of the reconstruction-related algorithm.

16. The method of claim 12, wherein the determining multiple containers for executing the multiple reconstruction-related algorithms includes:
   for one of the multiple reconstruction-related algorithms,
      determining whether there is an existing container containing the reconstruction-related algorithm;
      in response to determining there is no existing container containing the reconstruction-related algorithm, determining whether there is a container containing a second reconstruction-related algorithm; and
      in response to determining that there is the container containing the second reconstruction-related algorithm, replacing the second reconstruction-related algorithm in the container with the first reconstruction-related algorithm.

17. The method of claim 12, wherein for at least some of the multiple containers arranged in the order, an output of a container is an input of a subsequent container according to the order.

18. The method of claim 12, wherein the processing the raw data according to the reconstruction flow to generate a target image includes:
   determining a first container group from the multiple containers, the first container group including at least one container;
   processing the raw data using the first container group to generate image data;
   determining a second container group from the multiple containers, the second container group including at least one container; and
   processing the image data using the second container group to generate the target image.

19. The method of claim 12, wherein each of at least one of the multiple containers receive an input from at least one container.

20. A non-transitory computer-readable medium storing a set of instructions, the set of instructions, when executed by a computing device, causing the computing device to implement a method, the method comprising:
   obtaining raw data generated by scanning an object;
   determining multiple reconstruction-related algorithms;
   determining multiple containers for executing the multiple reconstruction-related algorithms, each of the multiple containers containing at least one of the multiple reconstruction-related algorithms;
   determining a reconstruction flow by arranging the multiple containers in an order based on the multiple reconstruction-related algorithms contained in the multiple containers;
   for each container of the multiple containers:
      determining, by the container, a hardware resource that is idle from a plurality of hardware resources, wherein the plurality of hardware resources take instructions in different computer languages; and
      compiling, by the container, the reconstructed-related algorithm contained in the container to a computer language format understandable by the hardware resource; and
   processing the raw data according to the reconstruction flow to generate a target image by executing the multiple containers arranged in the order.

* * * * *